(12) United States Patent
Matsuda et al.

(10) Patent No.: US 9,291,444 B2
(45) Date of Patent: Mar. 22, 2016

(54) LIGHT REFLECTION MECHANISM, OPTICAL INTERFEROMETER AND SPECTROMETRIC ANALYZER

(75) Inventors: Shinya Matsuda, Takarazuka (JP); Satoru Hirose, Tondabayashi (JP)

(73) Assignee: Konica Minolta Holdings, Inc., Tokyo (JP)

( * ) Notice: Subject to any disclaimer, the term of this patent is extended or adjusted under 35 U.S.C. 154(b) by 445 days.

(21) Appl. No.: 13/265,436

(22) PCT Filed: Mar. 30, 2010

(86) PCT No.: PCT/JP2010/055677
§ 371 (c)(1),
(2), (4) Date: Oct. 20, 2011

(87) PCT Pub. No.: WO2010/122879
PCT Pub. Date: Oct. 28, 2010

(65) Prior Publication Data
US 2012/0038927 A1    Feb. 16, 2012

(30) Foreign Application Priority Data
Apr. 23, 2009   (JP) ................ 2009-105071

(51) Int. Cl.
*G01J 3/45*    (2006.01)
*G01B 9/02*    (2006.01)
(2006.01)    *G01J 3/453*
(2006.01)    *G01J 9/02*
(2006.01)
(Continued)

(52) U.S. Cl.
CPC ........ *G01B 9/02024* (2013.01); *G01B 9/02044* (2013.01); *G01B 9/02057* (2013.01);
(Continued)

(58) Field of Classification Search
CPC ......... G01J 3/45; G01J 3/4535; G01J 3/4532; H01L 41/053; G02B 26/105; G02B 26/20; G02B 26/06; G02B 26/001; G02B 2290/25
See application file for complete search history.

(56) References Cited

U.S. PATENT DOCUMENTS 7,088,018 B2   8/2006   Matsumoto
7,889,349 B2 *   2/2011   Ridder et al. ............ 356/451
(Continued)

FOREIGN PATENT DOCUMENTS

JP   1999-231230   8/1999
JP   2001-305440   10/2001
(Continued)

OTHER PUBLICATIONS

D. Inoue et al., "Study on MEMS Mirror for Optical Spectrum Sensing", Kagawa University, Department of Intelligent Mechanical Systems Engineering.

*Primary Examiner* — Michael A Lyons
*Assistant Examiner* — Hina F Ayub
(74) *Attorney, Agent, or Firm* — Cozen O'Connor

(57) ABSTRACT

Provided is an inexpensive, high performance, compact, and energy saving light reflection mechanism comprising a first moving portion having a reflecting surface on the front surface, a supporting portion which supports the first moving portion, a first beam and a translating beam which couple the first moving portion and the supporting portion in the form of cantilever beam above and below the supporting portion, and a drive portion which moves the first moving portion, wherein a large amplitude can be obtained by small energy when the first moving portion is forced into resonance vibration in the direction perpendicular to the first reflecting surface. Also provided is an optical interferometer and a spectral analyzer.

4 Claims, 16 Drawing Sheets

(51) Int. Cl.
  *G01M 11/02* (2006.01)
  *G02B 26/00* (2006.01)
(52) U.S. Cl.
  CPC ............... *G01B9/02097* (2013.01); *G01J 3/02* (2013.01); *G01J 3/021* (2013.01); *G01J 3/4535* (2013.01); *G01J 9/02* (2013.01); *G01M 11/025* (2013.01); *G01M 11/0271* (2013.01); *G02B 26/001* (2013.01); *G01B 2290/35* (2013.01)

(56) References Cited

U.S. PATENT DOCUMENTS

| 2003/0174932 | A1* | 9/2003 | Avakian ........................ 385/18 |
| 2004/0027225 | A1 | 2/2004 | Lee et al. |
| 2005/0238282 | A1* | 10/2005 | Ishizuya ........................ 385/18 |
| 2006/0114467 | A1* | 6/2006 | Nicoli et al. ................ 356/450 |
| 2007/0076208 | A1* | 4/2007 | Koo .............................. 356/451 |
| 2008/0165402 | A1* | 7/2008 | Nakamura et al. ........... 359/198 |
| 2008/0204879 | A1 | 8/2008 | Manzardo et al. |
| 2009/0185133 | A1* | 7/2009 | Sakakibara ................... 351/211 |
| 2010/0053632 | A1* | 3/2010 | Alphonse et al. ............ 356/479 |

FOREIGN PATENT DOCUMENTS

| JP | 2004-212670 | 7/2004 |
| JP | 2004-309643 | 11/2004 |
| JP | 2005-148027 | 6/2005 |
| JP | 2008-309706 | 12/2008 |
| WO | WO 2006/000120 | 1/2006 |

* cited by examiner

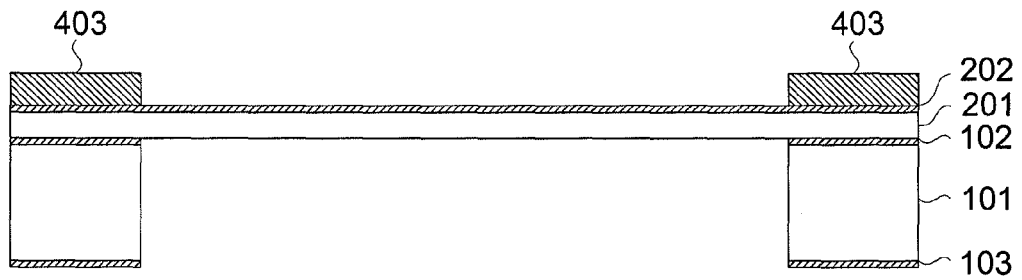
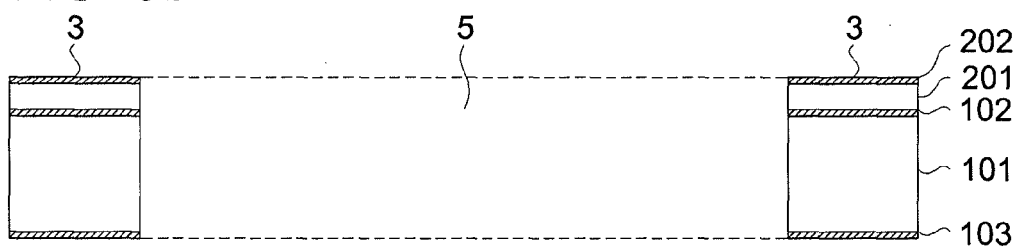
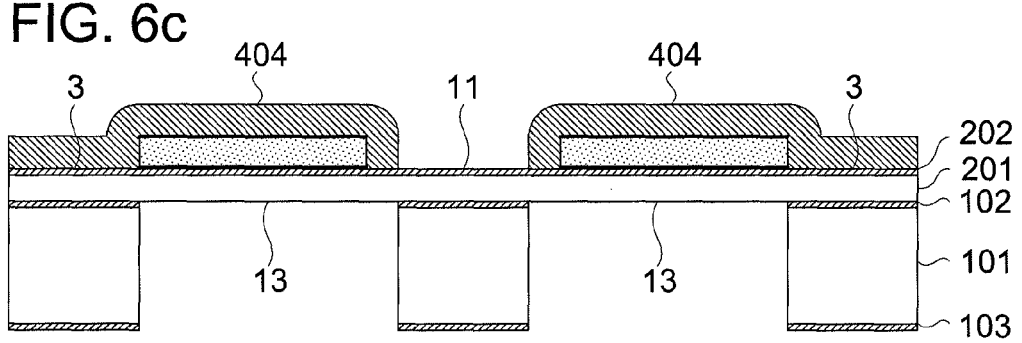
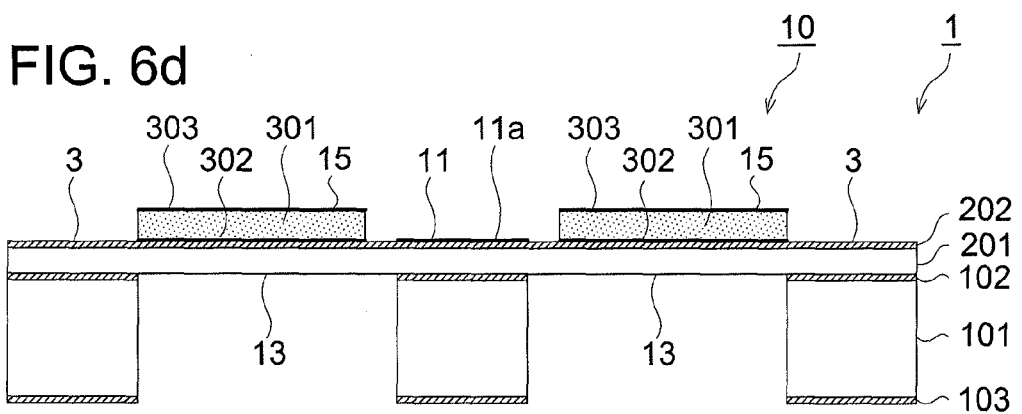

LIGHT REFLECTION MECHANISM, OPTICAL INTERFEROMETER AND SPECTROMETRIC ANALYZER

RELATED APPLICATIONS

This application is a U.S. National Phase Application under 35 USC 371 of International Application PCT/JP2010/055677 filed Mar. 30, 2010.

This application claims the priority of Japanese application No. 2009-105071 filed Apr. 23, 2009, the entire content of which is hereby incorporated by reference.

TECHNICAL HELD

The present invention relates to a light reflection mechanism, optical interferometer and spectrometric analyzer, particularly to a light reflection mechanism, optical interferometer and spectrometric analyzer formed by the microfabrication technology.

BACKGROUND ART

Optical interferometers have been used in the field of examining the profile of an optical element such as a lens or a prism. Namely, the light from a laser source is separated into two beams, and one of these beams is passed through a test piece (hereinafter referred to as "sample") such as a lens or a prism. After that, these two beams having been separated are put together, wherein an interference fringe is produced. This interference fringe is observed to measure the aberration of the lens or the flatness of the prism. In this method, the difference in the subtle optical properties generated in the sample can be enlarged by using the interference fringe to detect.

A spectrometric analyzer is known which employs a similar optical interferometer to detect wavelength component contained in the reflected light from the sample, thereby analyzing the elements contained in the sample. White light containing all the wavelengths in the measurement range is applied to the sample, and the light reflected therefrom is separated into two beams, similarly to the aforementioned case. The length of the optical path of one of these beams is changed on a continuous basis so that a difference in optical path is given between the separated beams. After that, two beams having been separated are put together to cause interference. Changes in the intensity of the interference light are measured to detect the wavelength components contained in the reflected light.

In the meantime, a method is proposed in which an interferometer for the spectrometric analyzer is made by using the MEMS (Micro-Electromechanical Systems) technology as a microfabrication technology based on the semiconductor process. For example, Non-Patent Document 1 discloses a phase shift type spectroscope in which one of two mirrors is fixed in position and the other mirror is moved to cause interference of the reflected light.

Patent Document 1 discloses a lamellar grating interferometer as an interferometer for spectrometric analyzer in which one of comb-toothed lamellar gratings is fixed in position and the other is moved to cause interference.

Further, although this is different from the spectrometric analyzer, Patent Document 2 discloses an optical modulation element in which the MEMS technology is used to form a fixed mirror and a movable mirror, and the movable mirror is moved by electrostatic force with respect to the fixed mirror, thereby causing optical interference between the fixed mirror and the movable mirror. This optical interference is used to perform optical modulation. The same Patent Document also discloses a flat panel display element in which the aforementioned optical modulation elements are arranged and are driven individually to form an image.

RELATED ART DOCUMENT

Patent Document

Patent Document 1: Japanese Unexamined Patent Application Publication No. 2008-503732

Patent Document 2: Japanese Unexamined Patent Application Publication No. 2004-212670

Non-Patent Document

Non-Patent Document 1: Daisuke INOUE and Fumikazu OHIRA, "A Study of MEMS Mirror for Spectral Sensing", May 27, 2008; http://nsn.kyoto-u.ac.jp/wp-content/uploads/2008/04/h19-022.pdf: (searched on Mar. 13, 2009)

SUMMARY OF THE INVENTION

Object of the Invention

In the MEMS technology, a patterns are transferred onto the silicon substrate of larger area by a photolithography method, and etching is performed so that high-precision microscopically small shapes are formed in one operation; thus this technology has an advantage of a substantial cost reduction due to downsizing.

With regard to structure, a mirror is formed on a thin silicon substrate, and a curved beam is often used to move the mirror in the direction perpendicular to the mirror surface. However, to increase the amount of displacement of the mirror, the beam length and the driving power must be increased. This will result in an increase in the device size and hence production cost, with the result that the advantages of the MEMS technology cannot be effectively utilized.

When the aforementioned technologies are considered from this point of view, there are issues of downsizing, energy saving, and cost reduction with the method of the Non-Patent Document 1. That is because one of the two mirrors is fixed in position and the other mirror is movable and the movable mirror thus needs to have a large displacement; and the movement of the mirror is not based on resonance and thus needs a large driving force.

With regard to the method of Patent Document 1, the driving force can be reduced since the moving side lamellar grating is resonated; however there are issues of downsizing, energy saving, and cost reduction. That is because the moving side lamellar grating needs to be displaced by a large amount since one of the lamellar gratings is fixed.

In the method of Patent Document 2, there are issues of downsizing, energy saving, and cost reduction. That is because the moving side lamellar grating needs to be displaced by a large amount since one of the two lamellar gratings is fixed; and moving mirrors need to be driven separately by an electrostatic force and a large driving force is thus needed.

In view of the problems described above, it is an object of the present invention to provide a light reflection mechanism, an optical interferometer and a spectrometric analyzer which are compact, energy-saving, inexpensive, and yet high-performance.

Means for Solving the Object

An object of the present invention is achieved by the following structures.

Item 1. A light reflection mechanism, comprising:
a first moving portion which has a first reflection surface on a surface thereof;
a supporting portion which supports the first moving section;
a first beam which couples the first moving portion and the supporting section together;
a translating beam which couples the first moving portion and the supporting portion together at a position different, in a direction perpendicular to the first reflection surface, than the first beam couples; and
a driving portion for moving the first moving portion,
wherein the driving portion causes the first moving portion to vibrate in resonance in the direction perpendicular to the first reflection surface.

Item 2. A interferometer, comprising:
the light reflection mechanism of item 1;
a second reflection surface which is fixed; and
a beam splitter configured to split incident light into two portions each for the light reflection mechanism and the second reflection surface,
wherein the first moving portion of the light reflection mechanism and the second reflection surface reflect a light beam and split the light beam into two portions, the one portion of the incident light split by the beam splitter is made to enter and pass through a sample, and the light having passed through and the other portion of the reflected light are made to interfere.

Item 3. A spectrometric analyzer, comprising:
the light reflection mechanism of item 1; and
a second reflection surface which is fixed,
wherein light reflected by a sample is made to be split into two portions by being reflected by the first reflection surface of the first moving portion of the light reflection mechanism and the second reflection surface, and the split two portions of light is made to interfere.

Item 4. A light reflection mechanism, comprising:
a first moving portion which has a first reflection surface on a surface thereof;
a second moving portion which has on a surface thereof a second reflection surface formed on the same plane as the first reflection surface;
a supporting portion which supports the first moving portion and the second moving portion;
a first beam which couples the first moving portion and the supporting portion together;
a second beam which couples the second moving portion and the supporting portion together; and
a driving portion for moving the first moving portion and the second moving portion,
wherein the driving portion moves the first moving portion and the second moving portion in a direction perpendicular to the first surface and the second surface in opposite phases to each other.

Item 5. The light reflection mechanism of item 4, wherein movements of the first moving portion and the second moving portion are resonance vibrations in opposite phases Item 6. The light reflection mechanism of item 4, wherein the light reflection mechanism is configured to have a plane like shape which is parallel to the first reflection surface and the second reflection surface, the first moving portion and the second moving portion are configured with a relatively thick plate-like layer, and the first beam and the second beam are configured with a relatively thin plate-like layer.

Item 7. An interferometer, comprising:
the light reflection mechanism of item 4,
wherein the first moving portion and the second moving portion of the light reflection mechanism reflect a light beam and split the light beam into two portions, one portion of the reflected light is made to enter and pass through a sample, and the light having passed through and the other portion of the reflected light are made to interfere.

Item 8. A spectrometric analyzer, comprising:
the light reflection mechanism of item 4,
wherein light reflected by a sample is made to be split into two portions by being reflected by the first moving portion and the second moving motion of the light reflection mechanism, and the sprit two portions of the reflected light are made to interfere.

Effects of the Invention

The present invention provides a light reflection mechanism, an optical interferometer, and a spectrometric analyzer which are compact, energy-saving, inexpensive, yet high-performance since the mechanism includes: a first moving portion having a reflection surface on the surface thereof; a supporting portion which supports the first moving portion; a first beam and a translating beam which couple the first moving portion and the supporting portion together in a cantilever beam structure each at the upper part and the lower part of the supporting portion; and a driving portion which moves the first moving portion, and since a large amplitude can be obtained by small energy since the first moving portion is vibrated in resonance in the direction perpendicular to the first reflection surface.

The present invention further provides a light reflection mechanism, an optical interferometer, and a spectrometric analyzer which are compact, energy-saving, inexpensive yet high-performance since the embodiment includes: first and second moving portions each having a reflection surface thereon which is formed on the same plane; supporting portions which support the first and second moving portions; a first beam which couples the first moving portion and the supporting portion together; a second beam which couples the second moving portion and the supporting portion together; and a driving portion which moves the first and second moving portions, and since the first and second moving portions are moved in opposite phases in the direction perpendicular to the reflection surface on the surfaces of the first and second moving sections, the displacement of the first and second moving portions can be reduced by half, and a step of positioning the first and second moving portions can be eliminated.

BRIEF DESCRIPTION OF THE DRAWINGS

FIGS. 6a-6d are schematic diagrams (3/3) of the cross section showing the state in processes of FIG. 3;

DESCRIPTION OF EMBODIMENTS

Figure 1A:
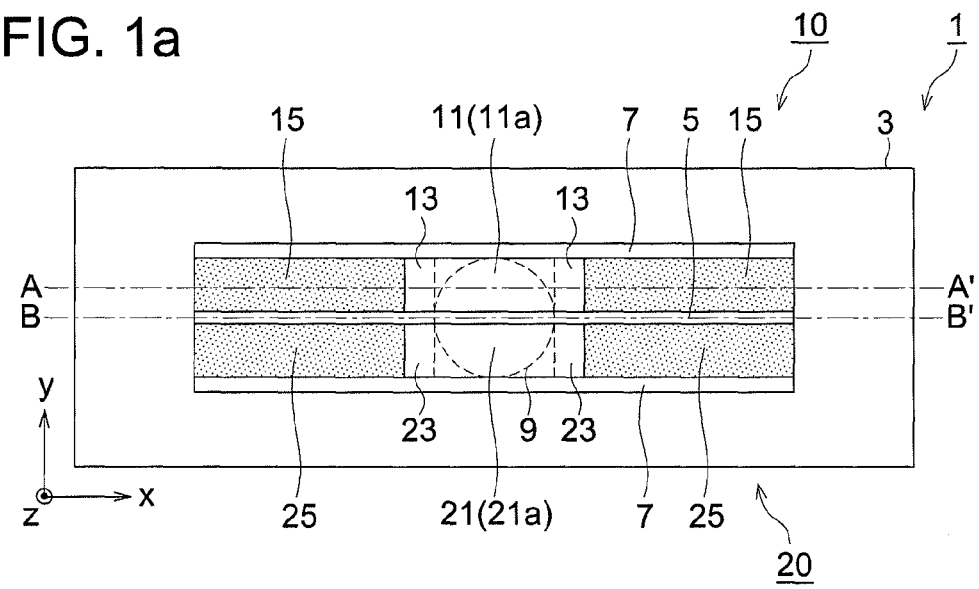
FIGS. 1a-1c are a schematic diagram showing the structure of a first embodiment of a light reflection mechanism.

The following describes the present invention with reference to the illustrated embodiments without the present invention being restricted thereto. The same or equivalent portions in the drawings are assigned the same reference numerals, and the descriptions thereof are omitted to avoid duplication.

Figure 1B:
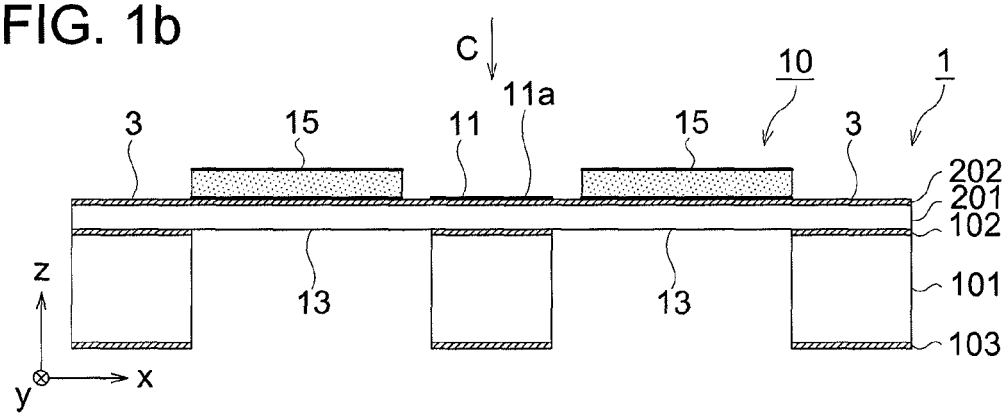
Figure 1C:
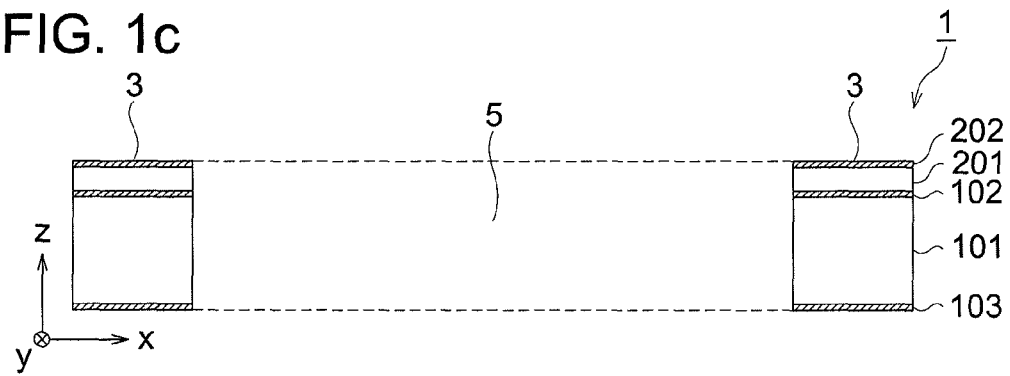

Referring to FIG. 1, the following describes the structure of a first embodiment of a light reflection mechanism in the present invention. FIGS. 1a and 1b are schematic diagrams showing the structure of the first embodiment of the light reflection mechanism of the present invention. FIG. 1a is a plan view of the light reflection mechanism observed from the direction of the arrow C of FIG. 1b. FIG. 1b shows the cross section taken along the line A-A' of FIG. 1a, and FIG. 1c shows the cross section taken along the line B-B' of FIG. 1a.

In FIG. 1a, the x axis is plotted from left to right, the y axis is plotted from bottom to top, and the z axis is plotted from back to front. In FIGS. 1b and 1c, the x axis is plotted from left to right, the z axis is plotted from bottom to top, and the y axis is plotted from front to back.

The light reflection mechanism 1 includes a supporting portion 3, a first moving portion 11, a second moving portion 21, two first beams 13, two second beams 23, two piezoelectric elements 15, and two piezoelectric elements 25. A first reflection surface 11a is formed on the surface of the first moving portion 11, and a second reflection surface 21a is formed on the surface of the second moving portion 21. The two piezoelectric elements 15 and two piezoelectric elements 25 serve as driving portions of the present invention.

The first moving portion 11, the first reflection surface 11a, the two first beams 13, and the two piezoelectric elements 15 constitute a first reflection system 10. The second moving portion 21, the second reflection surface 21a, the two second beams 23 and the two piezoelectric elements 25 constitute a second reflection system 20.

The first reflection system 10 and the second reflection system 20 have the same configuration and are arranged separately from each other with a gap portion 5 between them. The first reflection surface 11a and the second reflection surface 21a are formed on the same plane. As indicated by the broken line in the drawing, the light beam 9 inputted in the −z axis direction is applied across the first reflection surface 11a and second reflection surface 21a.

As will be described later in details with reference to FIGS. 2a and 2b, the first reflection surface 11a and the second reflection surface 21a are vibrating in resonance in opposite phases and moving parallel in the z-axis direction. This movement gives an optical path difference to the reflected light of the light beam 9, and the system functions as the light reflection mechanism for the optical interferometer and the spectrometric analyzer, which are described later.

The two first beams 13 are arranged between a first end of the first moving portion 11 in the x-axis direction and the portion, of the supporting portion 3, opposed to the first end of the first moving portion 11; and between a second end of the first moving portion 11 in the x-axis direction and the portion, of the supporting portion 3, opposed to the second end of the first moving portion 11. Thus, the first moving portion 11 and supporting portion 3 are coupled to each other in the x-axis direction. Similarly, the two second beams 23 couples the second moving portion 21 to the supporting portion 3 in the x-axis direction.

The supporting portion 3 is formed in a rectangular shape so as to surround the first reflection system 10 and the second reflection system 20. Two gap portions 7 which have the same shape and are parallel to the gap portion 5 are provided, to be extended in the x-direction, between the supporting portion 3 and first reflection system 10 and between the supporting portion 3 and second reflection system 20. As will be described later, the first moving portion 11 and second moving portion 21 vibrate in resonance in the z-axis direction with reference to the supporting portion 3.

In FIG. 1b, the first moving portion 11 and the supporting portion 3 are coupled together in the x-axis direction through two first beams 13. The piezoelectric elements 15 are mounted on the two first beams 13 to constitute the first reflection system 10. Similarly, the second moving portion 21 and the supporting portion 3 are coupled together through two second beams 23. The piezoelectric elements 25 are arranged on the two second beams 23 to constitute the second reflection system 20.

In FIG. 1c, in the cross section taken along the line B-B' of FIG. 1a, the gap portions 5 is formed between the supporting portions 3.

The manufacturing procedure will be described with reference to FIG. 3 and the later diagrams. In the first embodiment, the light reflection mechanism 1 is formed by processing the SOI (Silicon On Insulator) substrate by MEMS technique. The supporting portion 3, the first moving portion 11 and the second moving portion 21 are made up of a thick substrate layer 101 and thin active layer 201 of the SOI substrate. The two first beams 13 and the two second beams 23 are made up of a thin active layer 201 of the SOI substrate and others.

The supporting portion 3 is made up of a thick substrate layer 101 and thin active layer 201 of the SOI substrate to realize high rigidity of the supporting portion 3. Further, the first moving portion 11 and the second moving portion 21 are made up of the thick substrate layer 101 and the thin active layer 201 of the SOI substrate to realize high rigidity of the first moving portion 11 and the second moving portion 21 and keep the distortion of the moving portion small.

Further, the first beams 13 and the second beams 23 are made up of the thin active layer 201 of the SOI substrate to realize high flexibility of the first beams 13 and the second beams 23, which configuration is advantageous for resonance vibration.

Figure 2A:
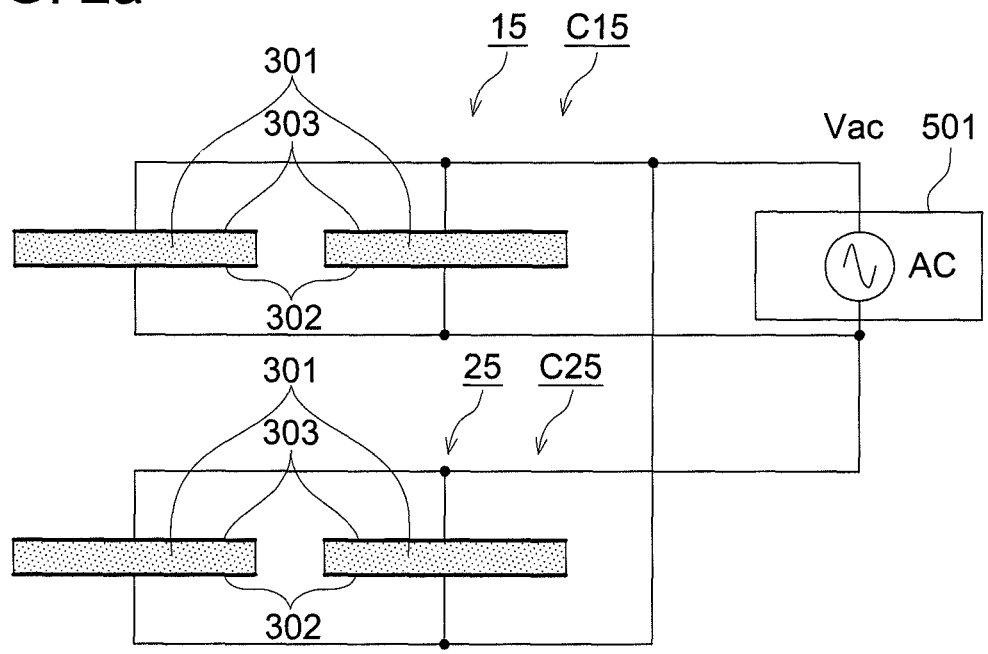
FIGS. 2a and 2b are schematic diagrams showing how to drive the first embodiment of the light reflection mechanism.
Figure 2B:
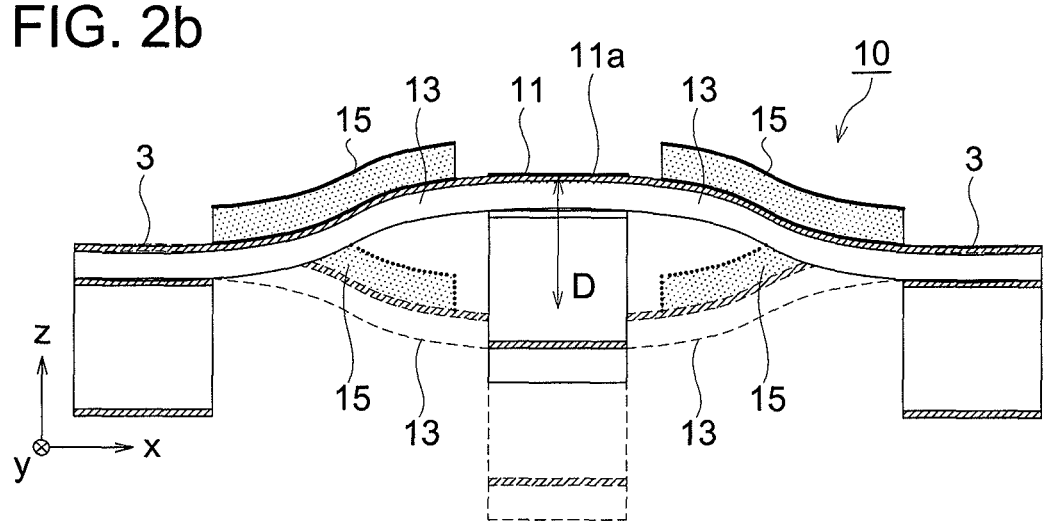

The following describes the drive method of the first embodiment of the light reflection mechanism of the present invention with reference to FIGS. 2a and 2b. FIGS. 2a and 2b are schematic diagrams showing how to drive the first embodiment of the light reflection mechanism. FIG. 2a shows an equivalent circuit of the light reflection mechanism 1 and FIG. 2b is a schematic diagram in the cross section taken along the line A-A of FIG. 1a and shows the drive method.

In FIG. 2a, the two piezoelectric elements 15 arranged on the two first beams 13 of the first reflection system 10 of the light reflection mechanism 1 are electrically equivalent to the two capacitors C15 having the piezoelectric layer 301 between the lower electrode 302 and upper electrode 303. Similarly, the two piezoelectric elements 25 arranged on the two second beams 23 of the second reflection system 20 are electrically equivalent to the two capacitors C25 having the piezoelectric layer 301 between the lower electrode 302 and upper electrode 303.

In the first embodiment, the parallel-connected upper electrode 303 of the two piezoelectric elements 15 and the parallel-connected lower electrode 302 of the two piezoelectric elements 25 are connected with each other and they are connected with one terminal of the drive circuit 501 (alternating-current power supply). Similarly, the parallel-connected lower electrode 302 of the two piezoelectric elements 15 and the parallel-connected upper electrode 303 of the two piezoelectric elements 25 are connected with each other and further connected with the other terminal of the drive circuit 501 (alternating-current power supply).

In this arrangement, when a sine wave AC voltage Vac, for example, is applied to the two piezoelectric elements 15 and the two piezoelectric elements 25 from the drive circuit 501 (alternating-current power supply), the two piezoelectric elements 15 and two piezoelectric elements 25 are supplied with sine wave AC voltages Vac, which have phases opposite to each other.

In FIG. 2b, the two piezoelectric elements 15 of the first reflection system 10 supplied with the sine wave AC voltage Vac repeatedly expand and contract in the x, y and z axes directions by the piezoelectric effect in accordance to the applied sine wave AC voltage Vac, with the volume being constant, thereby vibrating the two first beams 13 in the z-axis direction similarly to the case of a bimetal. This vibration causes the first moving portion 11 to repeatedly move parallel in the z-axis direction. The same thing goes with the second reflection system 20, and the second moving portion 21 repeatedly move parallel in the z-axis direction in the phase opposite to that of the first moving portion 11.

When the frequency of the sine wave AC voltage Vac is the same as the natural frequency of the first reflection system 10, the two first beams 13 vibrate in resonance in the z-axis direction, and the first moving portion 11 can vibrate with a great amplitude D in the z-axis direction even driven by the small driving force of the piezoelectric element. The same thing goes with the second reflection system 20.

Here is a brief description of the resonance vibration. If the first beam 13 is sufficiently thin, the first moving portion 11 and the first beam 13 can be considered as a vibration system in which the first moving portion 11 is a weight and the first beam 13 is a spring. Assuming that the mass of the first moving portion 11 is m the displacement is z, the length of the first beam 13 is l, the second moment of area of the beam is I, and Young's modulus is E, then the following equation of motion holds:

$$m\frac{d^2 z}{dt^2} = -\frac{3EI}{l^3}z \qquad \text{[Mathematical Formula 1]}$$

The natural period T of this vibration system can be expressed as follows:

$$T = 2\pi\sqrt{\frac{ml^3}{3EI}} \qquad \text{[Mathematical Formula 2]}$$

The amplitude gain in resonance vibration is called the Q(uality) factor, which changes with the viscous resistance of the vibration system. In the case of a silicon (hereinafter referred to as "Si") material, the Q factor is generally on the order of 100 through 1000.

The first reflection system 10 and the second reflection system 20 are made of the same material and are designed in the same configuration. Accordingly, they have the same natural frequency and are vibrate in resonance at the same cycle. When the same driving force is applied, the first reflection system 10 and second reflection system 20 have the same amplitude. Therefore, as shown in the broken line of FIG. 2b, when the sine wave AC voltage Vac is applied, the second moving portion 21 of the second reflection system 20 vibrates in resonance in the z-axis direction with the amplitude D in a phase opposite to that of the first moving portion 11 of the first reflection system 10.

As described above, the first moving portion 11 and the second moving portion 21 are in phases opposite to each other, and vibrate in resonance in the z-axis direction with the amplitude D. Thus, 2D is the in the optical path difference between the first moving portion 11 and the second moving portion 21 with respect to the light beam 9 applied in the direction of the arrow C (the direction of −z) of FIG. 1b. To be more specific, the optical path difference is double that in the system disclosed in above-mentioned Patent Documents in which either the first moving portion 11 or the second moving portion 21 is fixed in position.

To put it the other way around, in order to get the same optical path difference as that of the earlier documents, the first moving portion 11 and the second moving portion 21 are just required to have a half the amplitude (D/2) in the earlier documents.

Further, since the resonance frequency is used to get a larger displacement, the necessary difference in optical path length can be obtained by a shorter beam and a smaller driving force of the piezoelectric element, with the result that the advantages of compact configuration and reduced costs are provided.

If the resonance frequency is not used, a position sensor must be provided to detect the position of the moving portion for a feedback control of driving, and the required reproducibility in position for interferometers and spectrometric analyzers is a level of a wave length of light. Accordingly, those sensors and control circuits are very expensive.

In contrast, when the resonance vibration is used, the position of the moving portion varies in a sine wave manner; thus the control of the phase and the amplitude of the resonance vibration ensures a high reproducibility in position. Therefore, expensive sensors and the control circuits are not required, and cost reduction is realized.

Figure 3:
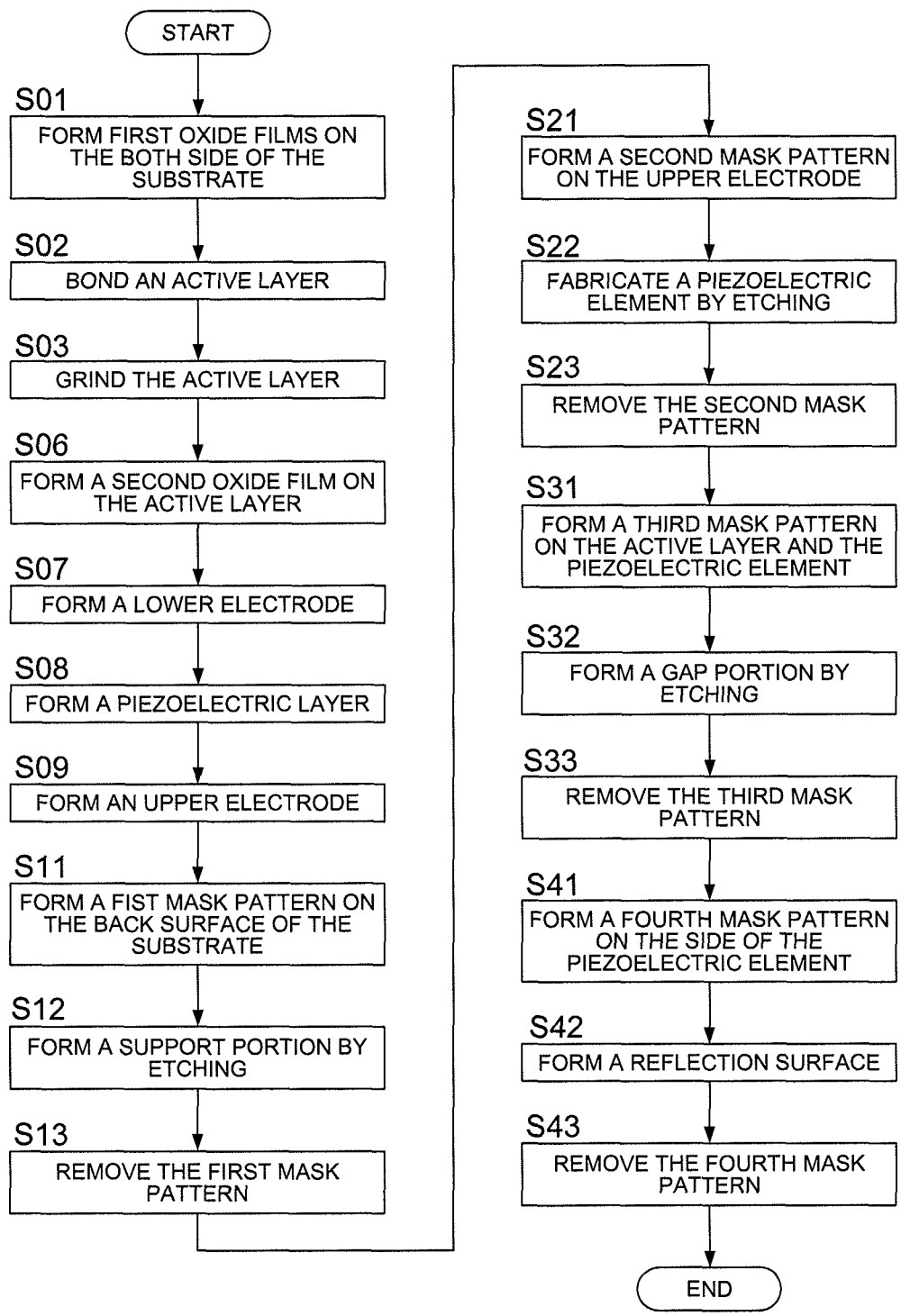
FIG. 3 is a process chart showing how to manufacture the first embodiment of the light reflection mechanism.

Referring to FIGS. 3 through 6d, the following describes the method of manufacturing the first embodiment of the light reflection mechanism of the present invention. FIG. 3 is a process chart showing how to manufacture the first embodiment of the light reflection mechanism 1 of the present invention. FIGS. 4a through 6d are schematic diagrams of the cross section showing the state in each process of FIG. 3.

Referring to FIGS. 4a through 6d, the following describes each process of FIG. 3. FIGS. 4a through 6d except FIGS. 6a and 6b are cross sections taken along the line A-A' of FIG. 1a. FIGS. 6a and 6b are cross sections taken along the line B-B' of FIG. 1A.

(SOI Substrate Forming Step)

Figure 4A:
FIGS. 4a-4e are schematic diagrams (1/3) of the cross section showing the state in processes of FIG. 3.

Steps S01 through S03 of FIG. 3 are used to form an SOI substrate. As shown in FIG. 4a, the substrate layer 101 made of Si is subjected to high-temperature processing in the Step S01. First oxide films 102 and 103 are formed on the front and back surfaces of the substrate layer 101. The thickness of the substrate layer 101 depends on the required flatness and mass of the moving portion, and in general this thickness is approximately 500 µm. Further, the thickness of the first oxide films 102 and 103 depends on the etching process described later, and in general this thickness does not exceed 1 µm.

Figure 4B:
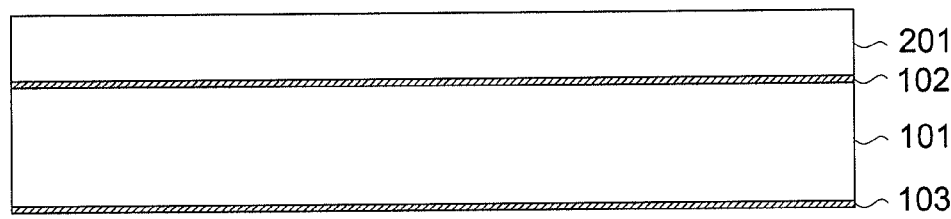

As shown in FIG. 4b, in Step S02, an Si substrate 201 to be an active layer is bonded onto the first oxide film 102 on the surface of the substrate layer 101. The bonding can be done by the room-temperature bonding in which the surface is cleaned and activated by plasma or others or the anode bonding based on the use of electric field.

Figure 4C:
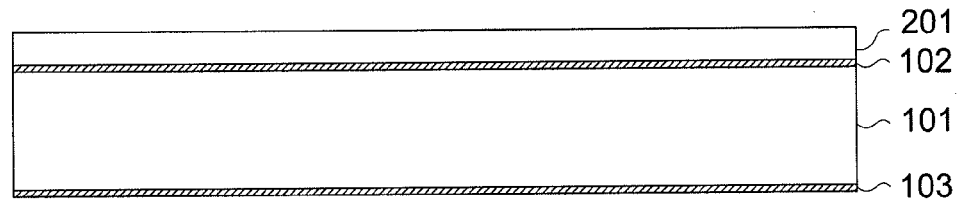

As shown in FIG. 4c, in Step S03, the Si substrate 201 is ground to be a thin active layer 201. The thickness of the active layer 201 depends on the required rigidity of the beam, and in general this thickness is approximately 10 µm. The above-mentioned steps are the same as those used to produce general SOI substrates. Several other methods have been proposed to produce SOI substrates.

(Piezoelectric Body Forming Process)

Figure 4D:
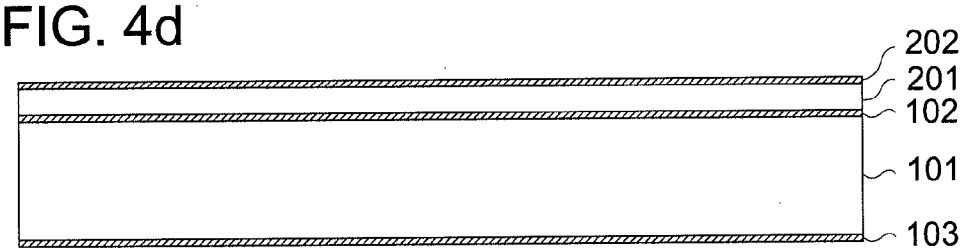

Steps S06 through S09 of FIG. 3 are a process for forming a piezoelectric body 300. As shown in FIG. 4d, in Step S06, a second oxide film 202 is formed on the surface of the active layer 201 by heat treatment or other method. The thickness of second oxide film 202 depends on the etching process to be described later, and in general this thickness does not exceed 1 µm.

Figure 4E:
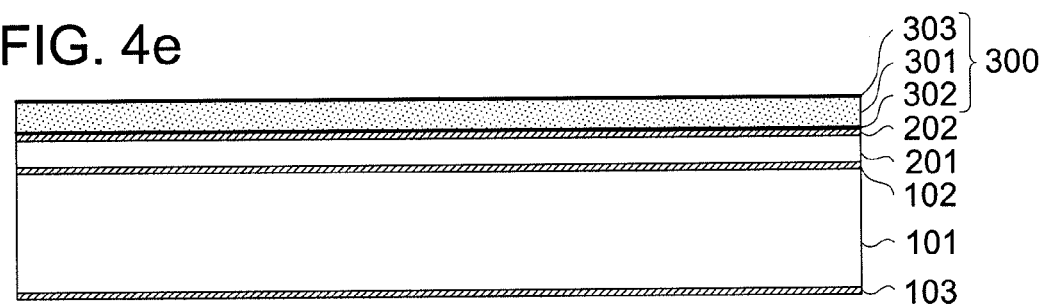

In Step S07, a lower electrode 302 made of Pt or the like is formed on the second oxide film 202 by the sputtering method or the like. In Step S08, a piezoelectric layer 301 is formed on the lower electrode 302 by the sputtering method or the like. In Step S09, an upper electrode 303 is formed on the piezoelectric layer 301 by the sputtering method or the like, whereby a piezoelectric body 300 is formed. FIG. 4e shows this state.

The piezoelectric body 300 formed by the above-mentioned steps is processed in Steps S21 through S23 to be described later and is formed into the piezoelectric elements 15 and 25. Further, since the piezoelectric layer 301 formed by sputtering is aligned in polarization at the time of film formation, there is no need for a special polarization process. However, if the piezoelectric layer 301 is formed by other methods, or when the temperature or if an electric field or a pressure used in the following steps is so high that polarization is lost, a separate polarization process must be conducted.

(Supporting Portion Forming Process)

Figure 5A:
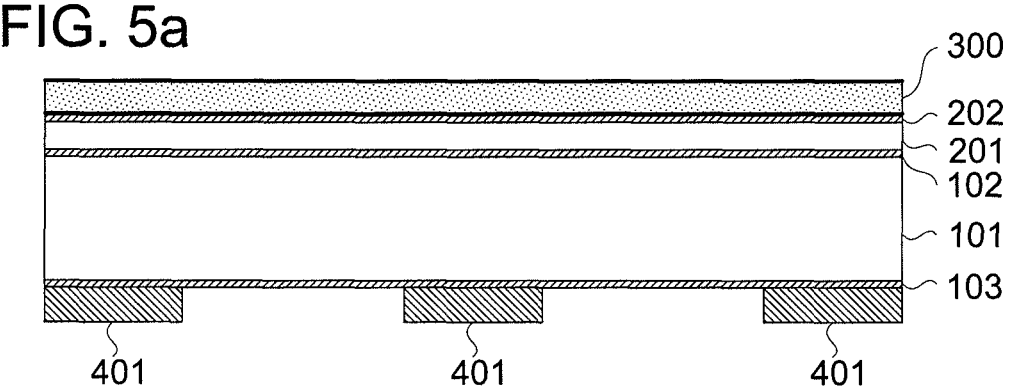
FIG. 5a-5d are schematic diagrams (2/3) of the cross section showing the state in processes of FIG. 3.

Steps S11 through S13 of FIG. 3 are a process for forming the supporting portion 3, the first moving portion 11 and the second moving portion 21. As shown in FIG. 5a, in Step S11, resist is coated on the first oxide film 103 on the back surface of the substrate layer 101, and a photolithography method is used to form a first mask pattern 401 on the portions which will be left as the supporting portion 3, the first moving portion 11 and the second moving portion 21.

Figure 5B:
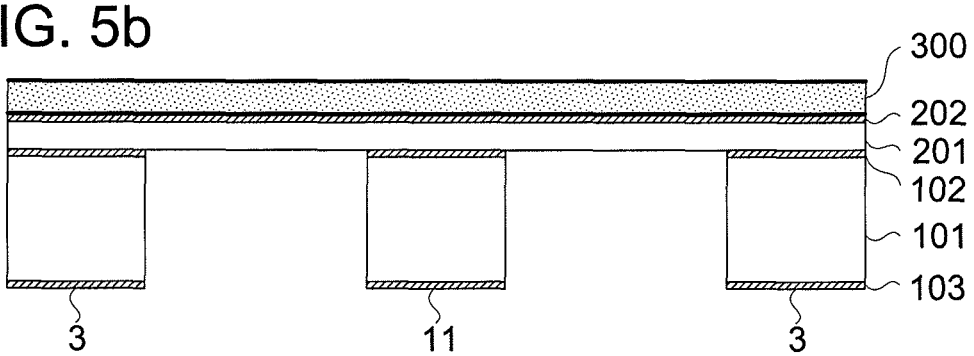

In Step S12, etching method is used to remove the first oxide film 103, the substrate layer 101 and the first oxide film 102 on the portions where the first mask pattern 401 is not formed. The depth of etching is determined by controlling the etching time. In Step S13, the remaining first mask pattern 401 is removed from the supporting portion 3, the first moving portion 11 and the second moving portion 21. FIG. 5b shows this state.

(Piezoelectric Element Forming Process)

Figure 5C:
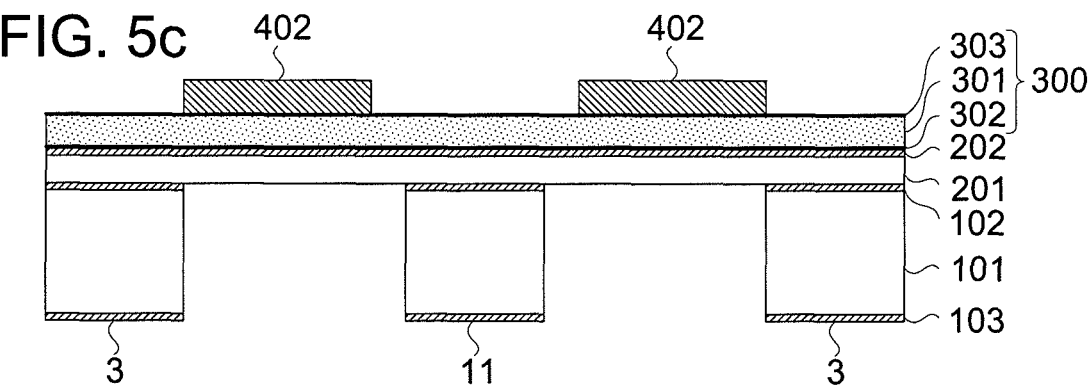

Steps S21 through S23 of FIG. 3 are a process for forming piezoelectric elements 15 and 25 from the piezoelectric body 300. As shown in FIG. 5c, in Step S21, resist is coated on the upper electrode 303 of the piezoelectric body 300, and photolithography method is used to form a second mask pattern 402 on the portions where the piezoelectric body 300 will be left as the piezoelectric elements 15 and 25.

Figure 5D:
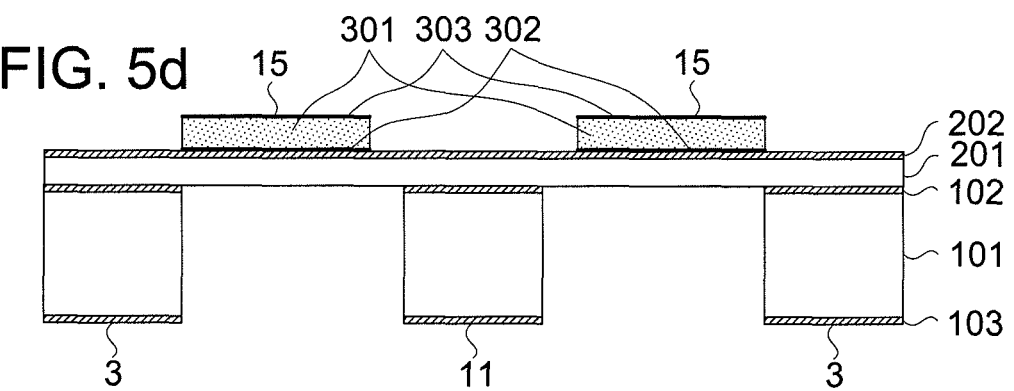

In Step S22, etching method is used to eliminate the upper electrode 303, piezoelectric layer 301 and lower electrode 302 on the portion where the second mask pattern 402 is not formed. The depth of etching is determined by controlling the etching time. In Step S23, the remaining second mask pattern 402 is removed from the piezoelectric elements 15 and 25. FIG. 5d shows this state.

(Gap Portion Forming Process)

Steps S31 through S33 of FIG. 3 are a process for forming gap portions 5 and 7, first beams 13 and second beams 23. As shown in FIG. 6a, in Step S31, resist is coated on the second oxide film 202 on the active layer 201 and the piezoelectric elements 15 and 25, and photolithography method is used to form a third mask pattern 403 on the entire surface except the portion in which gap portions 5 and 7 are formed. As described above, FIGS. 6a and 6b are cross sections taken along the line B-B' of FIG. 1a.

In Step S32, etching method is used to remove the second oxide film 202 and the active layer 201 on the portions on which the third mask pattern 403 is not formed so as to form the gap portions 5 and 7. This procedure results in the formation of the first beams 13 and second beams 23. The depth of etching is determined by controlling the etching time. In Step S33, the remaining third mask pattern 403 is removed from the second oxide film 202 on the active layer 201 and the piezoelectric elements 15 and 25. FIG. 6b shows this state.

(Reflection surface Forming Process)

Steps S41 through S43 of FIG. 3 area process for forming a first reflection surface 11a on the first moving portion 11, and a second reflection surface 21a on the second moving portion 21. As shown in FIG. 6c, in Step S41, resist is coated on the second oxide film 202 on the active layer 201 and the piezoelectric elements 15 and 25. Photolithography method is used to form a fourth mask pattern 404 on the entire surface other than the portions on which a first reflection surface 11a on the first moving portion 11 and a second reflection surface 21a on the second moving portion 21 are to be formed.

In Step S42, sputtering or other method is used to form an Al or Cr film on the portion, on the first moving portion 11 and the second moving portion 21, on which the fourth mask pattern 403 is not formed whereby the first reflection surface 11a and the second reflection surface 21a are formed. In Step S33, the remaining fourth mask pattern 404 is removed on the second oxide film 202 of the active layer 201 and the piezoelectric elements 15 and 25, whereby the light reflection mechanism 1 is produced. FIG. 6d shows this state.

The reflection surface forming process in Steps S41 through 43 can be omitted when the light reflection mechanism 1 is used in the visible region, in which light absorption of Si does not affect and when the intensity of the light beam 9 is high enough to obtain a sufficient intensity of reflected light even with the reflectance of Si. In this case, the surface of Si serves as a reflection surface.

The above description described that the first embodiment employed an SOI substrate. Instead of an SOI substrate, an Si single layer substrate can be used and the configuration of the first embodiment may be formed by etching method or others. This modification may be applicable to other embodiments to be described later.

As described above, the first embodiment of the light reflection mechanism provides a light reflection mechanism, an optical interferometer, and a spectrometric analyzer which are compact, energy-saving, inexpensive yet high-performance since the embodiment includes: first and second moving portions each having a reflection surface thereon which is formed on the same plane; supporting portions which support the first and second moving portions; a first beam which couples the first moving portion and the supporting portion together, a second beam which couples the second moving portion and the supporting portion together; and a piezoelectric element provided on the first and second beams, and since the first and second moving portions are moved in opposite phases in the direction perpendicular to the reflection surface on the surfaces of the first and second moving sections, the displacement of the first and second moving portions can be reduced by half, and a step of positioning the first and second moving portions can be eliminated.

Figure 7A:
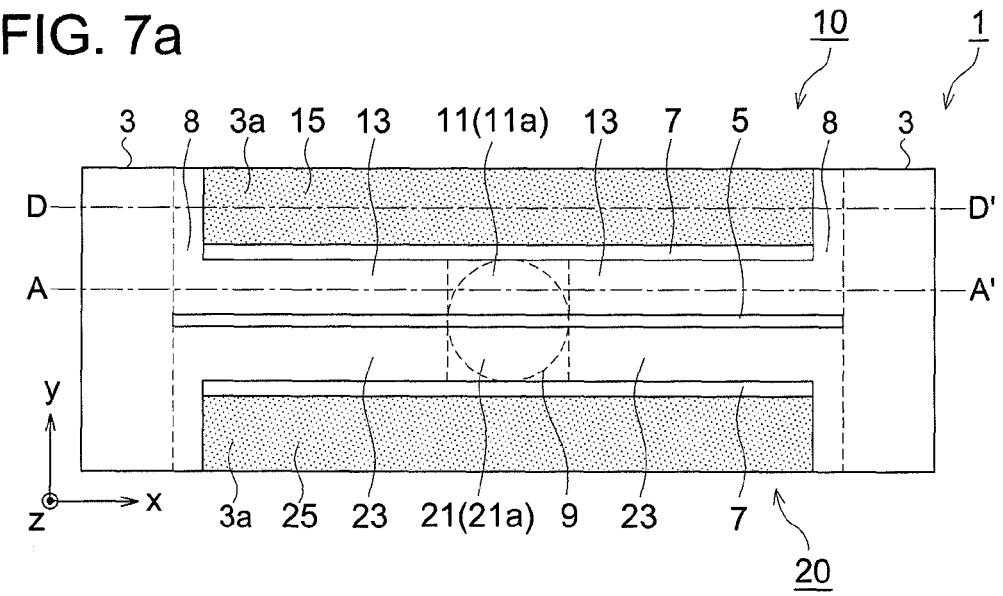
FIGS. 7a-7c are schematic diagrams showing the structure of a second embodiment of the light reflection mechanism.
Figure 7B:
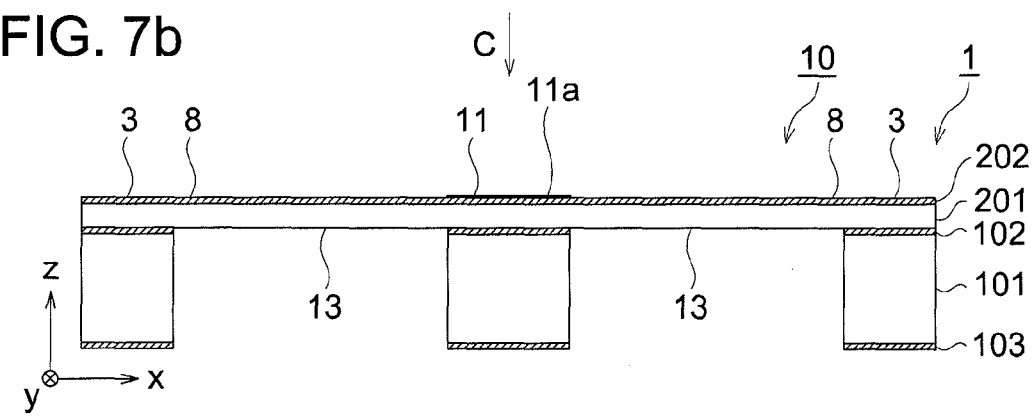
Figure 7C:
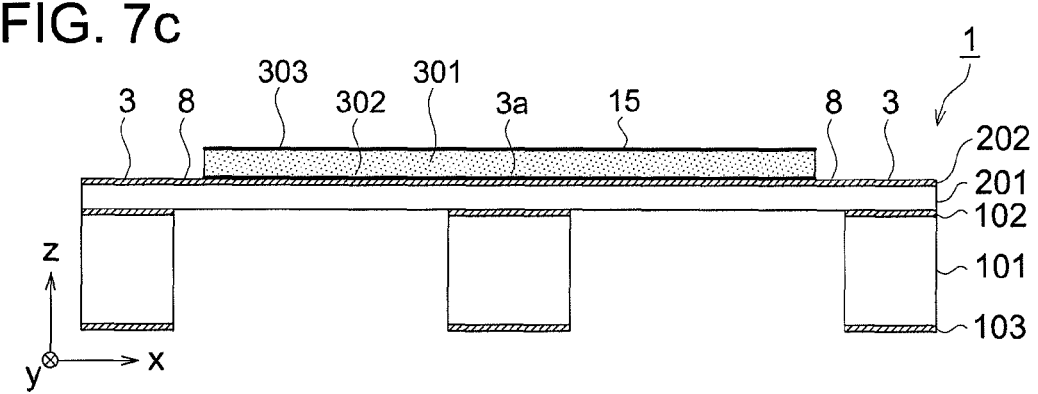

The following describes a second embodiment of the light reflection mechanism of the present invention with reference to FIGS. 7a-7c. FIGS. 7a-7c are schematic diagrams showing the structure of the second embodiment of the light reflection mechanism of the present invention. FIG. 7a is a plan view of the light reflection mechanism observed from the direction of the arrow C of FIG. 7b. FIG. 7b is a cross section taken along the line A-A' of FIG. 7a. FIG. 7c is a cross section taken along the line D-D of FIG. 7a.

With reference to FIGS. 7a-7c, the second embodiment is different from the first embodiment in the following three points:

(1) The piezoelectric elements 15 and 25 are arranged on the portions 3a, of the supporting portion 3, along the gap portions 7, not on each of two first beams 13 and two second beams 23.

(2) The portions 3a, of the supporting portion 3, along the gap portions 7 are made up of the active layer 201 of the SOI substrate, not the substrate layer 101 and the active layer 201 of the SOI substrate.

(3) The supporting position 3 is not directly connected with the first beams 13 and the second beams 23; instead a vibration transfer portions 8 are provided between the supporting position 3 and each of the first beams 13 and the second beams 23. The vibration transfer portions 8 are made up of the active layer 201 of the SOI substrate.

However, the gap portion 5 extends to the supporting portion 3 along the first beams 13 and the second beams 23. This arrangement causes separation between the vibration transfer portion 8 on the side of the first reflection system 10 and the vibration transfer portion 8 on the side of the second reflection system 20, and prevents the first reflection system 10 from being interfered by the second reflection system 20. Regarding the other structures, drive methods and manufacturing methods of the second embodiment are the same as those of the first embodiment.

In the second embodiment of the above-mentioned configuration, when the sine waves in opposite phases described with reference to FIGS. 2a and 2b are applied to the piezoelectric elements 15 and 25, the resonance vibration of the piezoelectric element 15 is transferred to the first beams 13 through the vibration transfer portions 8, and the first moving portion 11 accordingly vibrates in resonance in the z-axis direction. Similarly, the second moving portion 21 vibrates in resonance in the z-axis direction in the phase opposite to that of the first moving portion 11. The interference between the resonance vibration of the piezoelectric element 15 and that of the piezoelectric element 25 are separated by the gap portion 5 and then eliminated.

As described above, the second embodiment of the light reflection mechanism provides a light reflection mechanism, an optical interferometer, and a spectrometric analyzer which are compact, energy-saving, inexpensive yet high-performance and which includes: first and second moving portions each having a reflection surface thereon which is formed on the same plane; supporting portions which support the first and second moving portions; a first beam which couples the first moving portion and the supporting portion together; a second beam which couples the second moving portion and the supporting portion together; a piezoelectric element provided on the portion 3a, of the supporting portion 3, along the gap portion 7; and a vibration transfer portion provided between the supporting portion and the first and second beams, wherein since the first and second moving portions are moved in opposite phases in the direction perpendicular to the reflection surface on the surfaces of the first and second moving sections, the displacement of the first and second moving portions can be reduced by half, and a step of positioning the first and second moving portions can be eliminated.

Figure 8A:
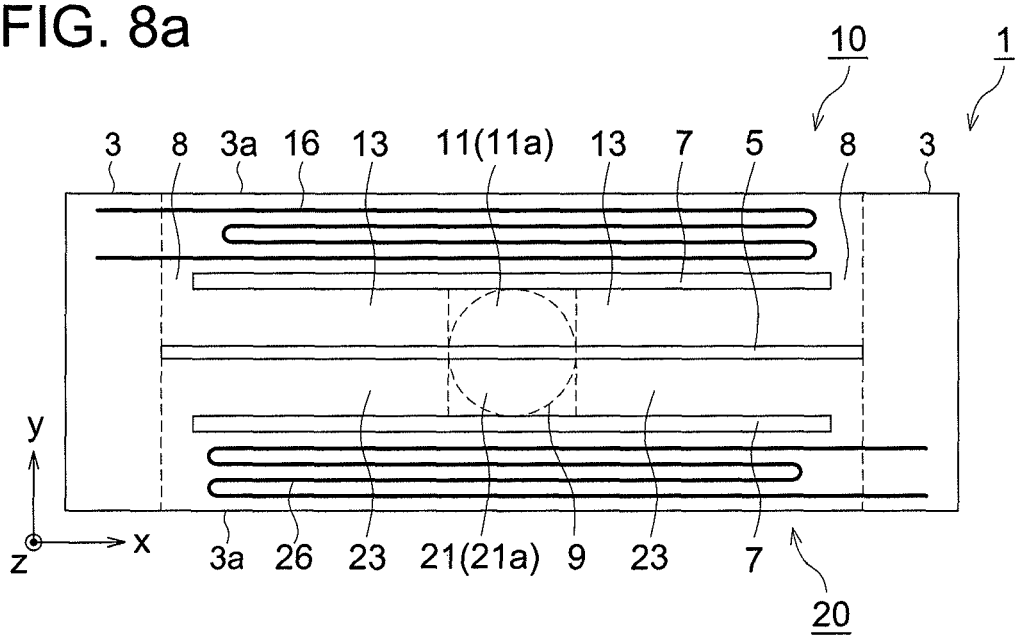
FIGS. 8a and 8b are schematic diagrams showing the structure of a third embodiment of the light reflection mechanism.
Figure 8B:
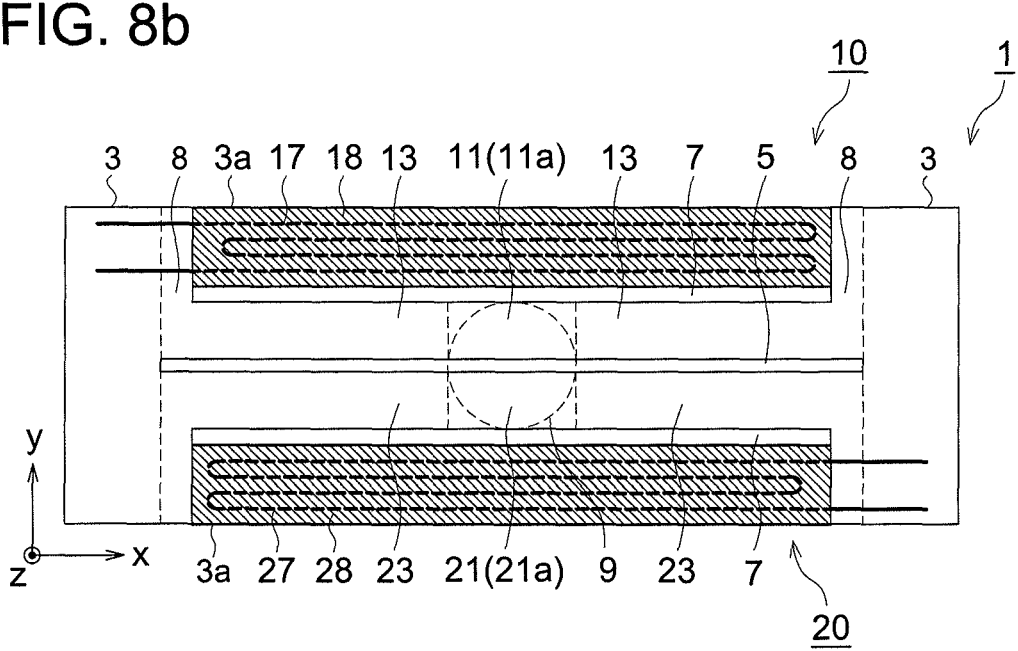

The following describes a third embodiment of the light reflection mechanism of the present invention with reference to FIGS. 8a and 8b. FIGS. 8a and 8b are schematic diagrams showing the structure of the third embodiment of the light reflection mechanism.

In the third embodiment, the piezoelectric elements 15 and 25 as the drive elements of the second embodiment are replaced with the drive element which uses thermal deformation. In FIG. 8a, the piezoelectric elements 15 and 25 are replaced with shape memory alloy wires 16 and 26. In FIG. 8b, the piezoelectric elements 15 and 25 are replaced with heaters 17 and 27 and bimetals 18 and 28. Regarding other configuration, the third embodiment is the same as the second one. Here the shape memory alloy wires 16 and 26 or the heaters 17 and 27 and bimetals 18 and 28 serve as the driving portions of the present invention.

In FIG. 8a, the shape memory alloy wires 16 and 26 are arranged in a loop on the portion 3a, of the supporting portion 3, along the gap portion 7, and the wiring width is small. This arrangement increases the electric resistance and hence the heat generation when power is on. Further, the speed of contraction to the memorized shape is increased. At the same time, this arrangement ensures quick cooling when power is off, thereby increasing the speed of returning to the original shape.

In FIG. 8b, similarly to the case of the piezoelectric elements 15 and 25 in the second embodiment, the bimetals 18 and 28 are arranged on the portions 3a, on the supporting portion 3, along the gap portions 7. The heaters 17 and 27 are arranged in a loop between the portion 3a, of the supporting portion 3, along the gap portion 7 and the bimetals 18 and 28, or on the bimetals 18 and 28, and the wiring width is small. This arrangement increases the electric resistance and the heat generation when power is on. Further, the speed of thermal deformation of the bimetals 18 and 28 is increased. At the same time, this arrangement ensures quick cooling when power is off, and increases the speed of returning to the original shape.

The shape memory alloy wire, the heaters 17 and 27 and the bimetal can be formed by photolithography method or the vapor deposition method, but they can be produced by bonding the metallic foil. This has the advantage of cutting down the production cost. Further, the piezoelectric elements 15 and 25 of the first embodiment can be replaced by the drive element using the thermal deformation of the third embodiment.

As described above, the third embodiment of the light reflection mechanism provides a light reflection mechanism, an optical interferometer, and a spectrometric analyzer which are compact, energy-saving, inexpensive yet high-performance since the embodiment includes: first and second moving portions each having a reflection surface thereon which is formed on the same plane; supporting portions which support the first and second moving portions; a first beam which couples the first moving portion and the supporting portion together; a second beam which couples the second moving portion and the supporting portion; a drive element provided on a portion 3a, of the supporting portion 3, along the gap portion 7 and utilizes the deformation caused by heat, and a vibration transfer portion provided between the supporting portion and the first and second beams, and since the first and second moving portions are moved in opposite phases in the direction perpendicular to the reflection surface on the surfaces of the first and second moving sections, the displacement of the first and second moving portions can be reduced by half, and a step of positioning the first and second moving portions can be eliminated.

Figure 9A:
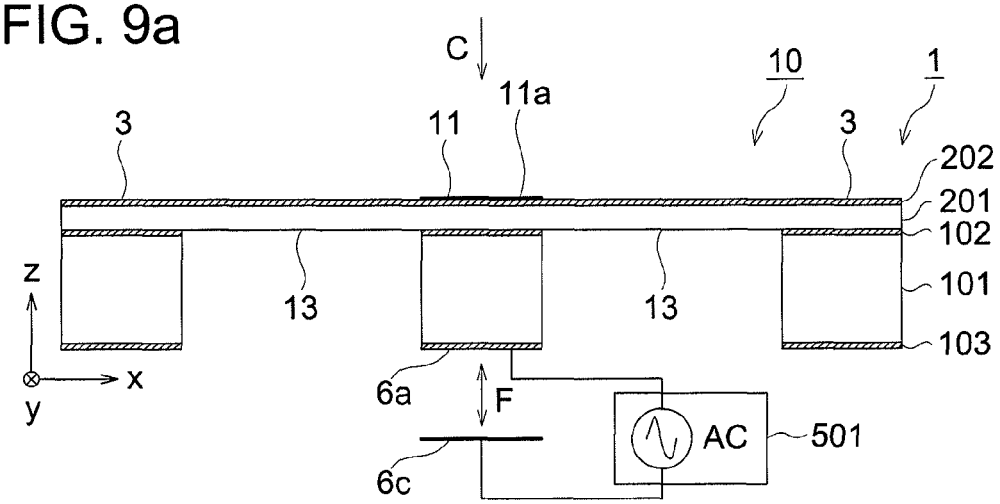
FIGS. 9a and 9b are schematic diagrams showing the structures of a fourth and fifth embodiments of the light reflection mechanism.
Figure 9B:
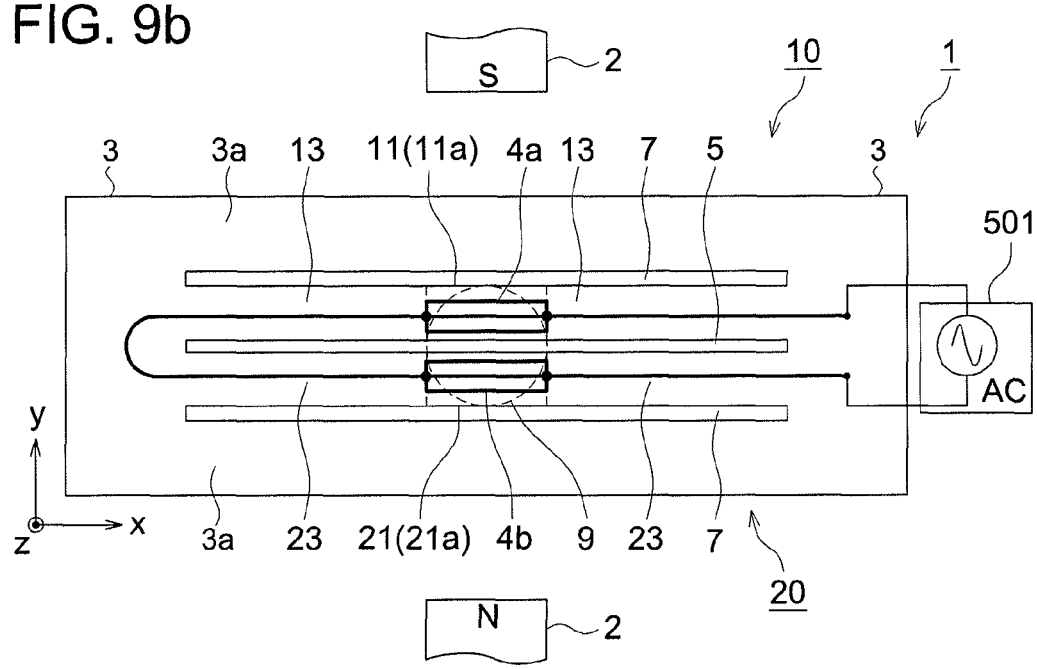

The following describes a fourth and fifth embodiments of the light reflection mechanism of the present invention with reference to FIGS. 9a and 9b. FIGS. 9a and 9b are schematic diagrams showing the structures of the fourth and fifth embodiments of the light reflection mechanism. FIG. 9a is the central cross sectional view of the first moving portion 11 showing the fourth embodiment corresponding to the cross section taken along the line A-A' of FIG. 1a. FIG. 9b is a plan view showing the fifth embodiment. In the fourth and fifth embodiments, the piezoelectric elements 15 and 25 as the drive elements of the first embodiment are replaced by the drive elements using electric and magnetic forces.

In FIG. 9a, an electrode 6a is arranged on the back surface of the first moving portion 11, and an electrode 6b is arranged on the back surface of the second moving portion 21. An electrode 6c integrally fixed to the supporting portion 3 is provided opposed to the electrodes 6a and 6b. Regarding the other configurations, the fourth and fifth embodiments are the same as the first one. Here the electrodes 6a, 6b and 6c serve as the drive sections of the present invention.

When an AC electric field of a resonance frequency in opposite phases are applied between the electrode 6a and the fixed electrode 6c, and between the electrode 6b and the fixed electrode 6c from an drive circuit 501 (alternating-current power supply AC), the first moving portion 11 and the second moving portion 21 vibrate in resonance in the z-axis direction in opposite phases by the static electricity F acting between the electrode 6a and the fixed electrode 6c, and between the electrode 6b and the fixed electrode 6c.

In FIG. 9b, an reed-screen-like electrode 4a is provided on the lower surface of the first reflection surface 11a of the first moving portion 11, and an reed-screen-like electrode 4b is provided on the lower surface of the second reflection surface 21a of the second moving portion 21. The reed-screen-like electrodes 4a and 4b are connected in series as illustrated. A pole S of the magnet 2 is arranged at one of the positions sandwiching the first moving portion 11 and second moving portion 21, outside the portion 3a, of the supporting portion 3, along the gap portion 7, and a pole N of the magnet 2 is provided at the other position. The magnet 2 is fixed integrally with the supporting portion 3. For the rest, the fourth and fifth embodiments are the same as the first one. Here the reed-screen-like electrodes 4a and 4b and magnet 2 serve as the drive sections of the present invention.

When the AC electric field of resonance frequency is applied to the reed-screen-like electrodes 4a and 4b connected in series by an drive circuit 501 (alternating-current power supply AC), the force in the direction reverse to the z-axis direction (Lorentz force) is applied to the reed-screen-like electrodes 4a and 4b by the interaction between the current flowing to the reed-screen-like electrodes 4a and 4b in the direction reverse to the x-axis direction and the magnetic field in the z-axis direction by the magnet 2. The first moving portion 11 and the second moving portion 21 vibrate in resonance in opposite phases.

The fourth and fifth embodiments need only electrodes and do not need other elements such as piezoelectric element for moving parts such as the first moving portion 11 and the second moving portion 21, and thus have an advantage of low production cost. Further, the piezoelectric elements 15 and 25 of the second embodiment can be replaced by the drive element using the electromagnetic force in the fourth and fifth embodiments.

As described above, the first embodiment of the light reflection mechanism provides a light reflection mechanism, an optical interferometer, and a spectrometric analyzer which are compact, energy-saving, inexpensive yet high-performance since the embodiment includes: first and second moving portions each having a reflection surface thereon which is formed on the same plane; supporting portions which support the first and second moving portions; a first beam which couples the first moving portion and the supporting portion together; a second beam which couples the second moving portion and the supporting portion together; and a drive element which uses the force acting between the electrodes provided on the first and second mobbing portions and the electrode or the magnet each integrally fixed on the supporting portion 3, and since the first and second moving portions are moved in opposite phases in the direction perpendicular to the reflection surface on the surfaces of the first and second moving sections, the displacement of the first and second moving portions can be reduced by half, and a step of positioning the first and second moving portions can be eliminated.

Figure 10A:
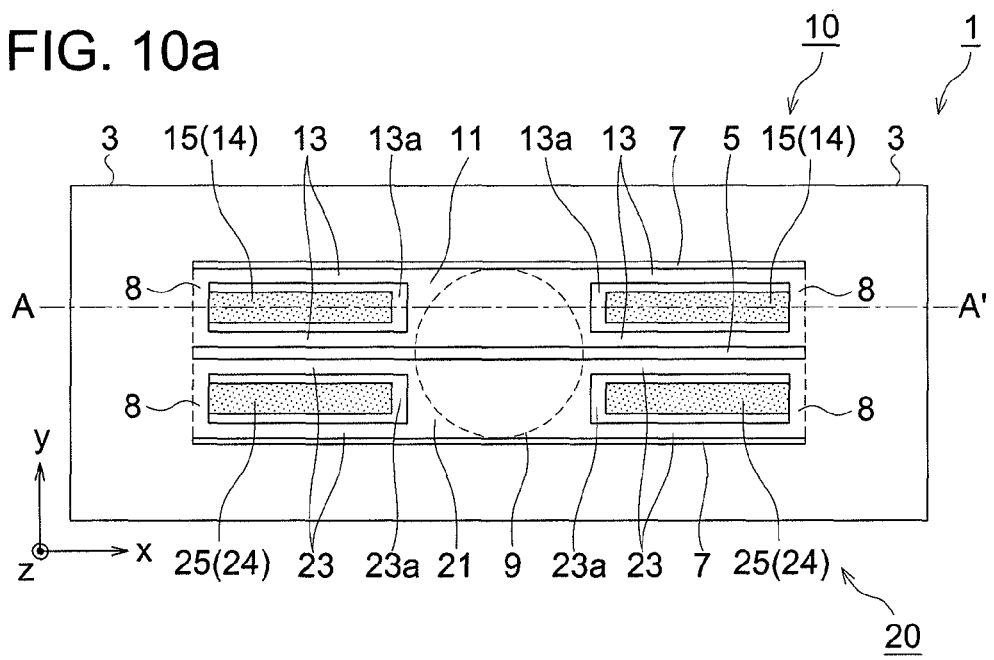
FIGS. 10a-10c are schematic diagrams showing the structure of a sixth embodiment of the light reflection mechanism.
Figure 10B:
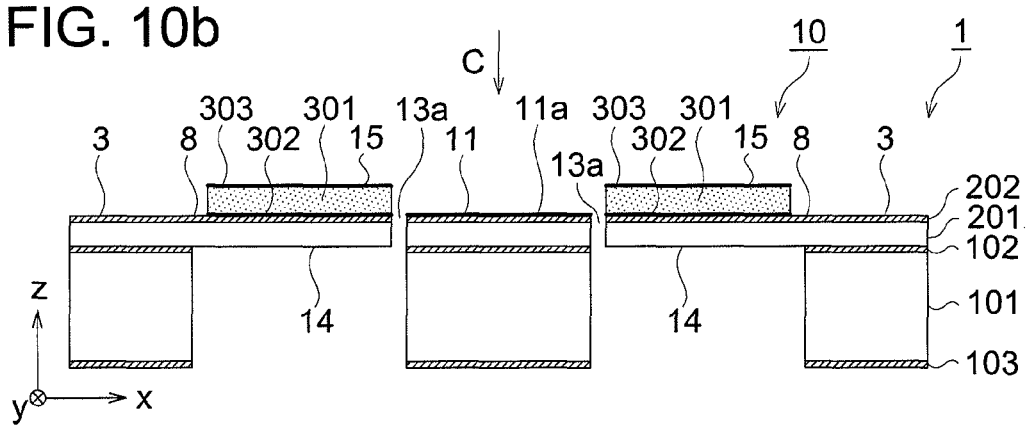
Figure 10C:
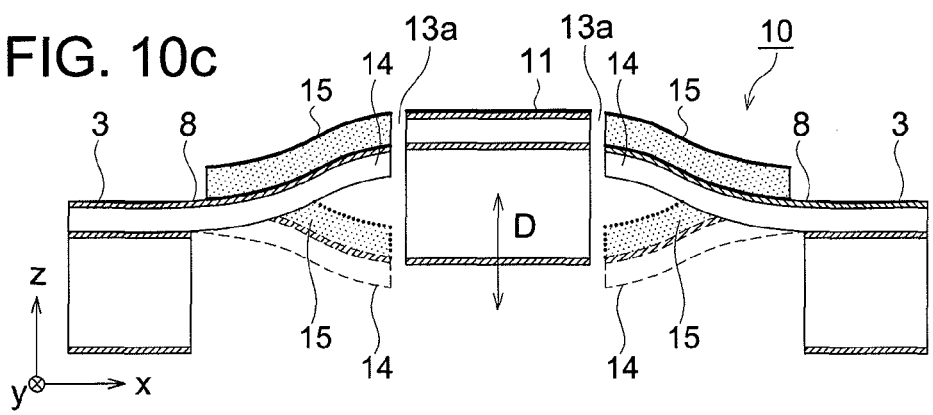

The following describes a sixth embodiment of the light reflection mechanism in the present invention with reference to FIGS. 10a-10c. FIGS. 10a-10c are schematic diagrams showing the structure of the sixth embodiment of the light reflection mechanism. FIG. 10a is a plan view of FIG. 10b viewed from the direction of the arrow C. FIG. 10b shows a cross section taken along the line A-A' of FIG. 10a, FIG. 10c is a schematic diagram showing FIG. 10b being driven. In the sixth embodiment, the method of the first embodiment in which the beam is directly vibrated is modified to the method in which the beam is vibrated by the vibration which is first generated by a drive piece and is then transferred to the beam.

The first reflection system 10 will be described. In FIGS. 10a and 10b, the first moving portion 11 of the first reflection system 10 is connected to the supporting portion 3 by means of two first beams 13 on both sides in the x-axis direction with the first moving portion 11 sandwiched in-between, and is supported in the x-axis direction. The vibration transfer portion 8 made up of the active layer 201 of the SOI substrate is provided between the supporting portion 3 and the four first beams 13, and the supporting portion 3 and the four first beams 13 are not directly connected.

A first drive piece 14 is arranged between the two first beams 13 with gap portions 13a, which separate the first beam 13 and the drive piece; and one end of the first drive piece 14 is coupled to the supporting portion 3 through a vibration transfer portion 8. The other end of the first drive piece 14 is free. The first drive piece 14 is designed in a so-called cantilever structure. A piezoelectric element 15 is formed on the first drive piece 14. Other than the above-mentioned configuration, the sixth embodiment is the same as the first embodiment of FIGS. 1a-1c. The second reflection system 20 has the same structure as the first reflection system 10.

In FIG. 10c, the piezoelectric elements 15 on the first drive pieces 14 are connected with the piezoelectric elements 25 on the second drive pieces 24 according to the manner shown in FIG. 2a, and they are connected to the alternating-current power supply AC. When the sine wave AC voltage Vac is applied to the piezoelectric elements 15 and 25 by the alternating-current power supply AC in this arrangement, the piezoelectric elements 15 and 25 are provided with sine wave AC voltage Vac in opposite phases.

When the sine wave AC voltage Vac is applied to the piezoelectric elements 15, the first drive pieces 14 are vibrated by the piezoelectric effect with the vibration transfer portion 8 functioning as a fulcrum. The vibration of the first drive pieces 14 are transferred to the first beams 13 through the vibration transfer portions 8, so that the first beams 13 are vibrated in the z-axis direction. When the frequency of the sine wave AC voltage Vac is appropriately set, the first beams 13 vibrate in resonance in the z-axis direction. Thus, the first moving portion 11 is vibrated with a large amplitude D even by a small driving force of a piezoelectric element. Similarly, the second moving portion 21 is vibrated in resonance in the z-axis direction in the phase opposite to that of the first moving portion 11.

In the sixth embodiment, the vibration is generated with the mass of the beam and that of the moving portion balanced so that the moving portion does not twist easily, and the flatness of the moving portion is secured. Other than the piezoelectric element, the drive element using the thermal deformation such as a shape memory alloy wire or a heater and a bimetal shown in the embodiments 3 through 5 can be used as the drive element provided on the first and second drive pieces. It is also possible to use the drive element using electric force and magnetic force such as static electricity or Lorentz force.

As described above, the sixth embodiment of the light reflection mechanism provides a light reflection mechanism, an optical interferometer, and a spectrometric analyzer which are compact, energy-saving, inexpensive yet high-performance and since the embodiment: first and second moving portions each having a reflection surface thereon which is formed on the same plane; supporting portions which support the first and second moving portions; a first beam which couples the first moving portion and the supporting portion together; a second beam which couples the second moving portion and the supporting portion together, and a drive piece provided on the first and second beams, and since the first and second moving portions are moved in opposite phases in the direction perpendicular to the reflection surface on the surfaces of the first and second moving sections, the displacement of the first and second moving portions can be reduced by half, and a step of positioning the first and second moving portions can be eliminated.

Figure 11A:
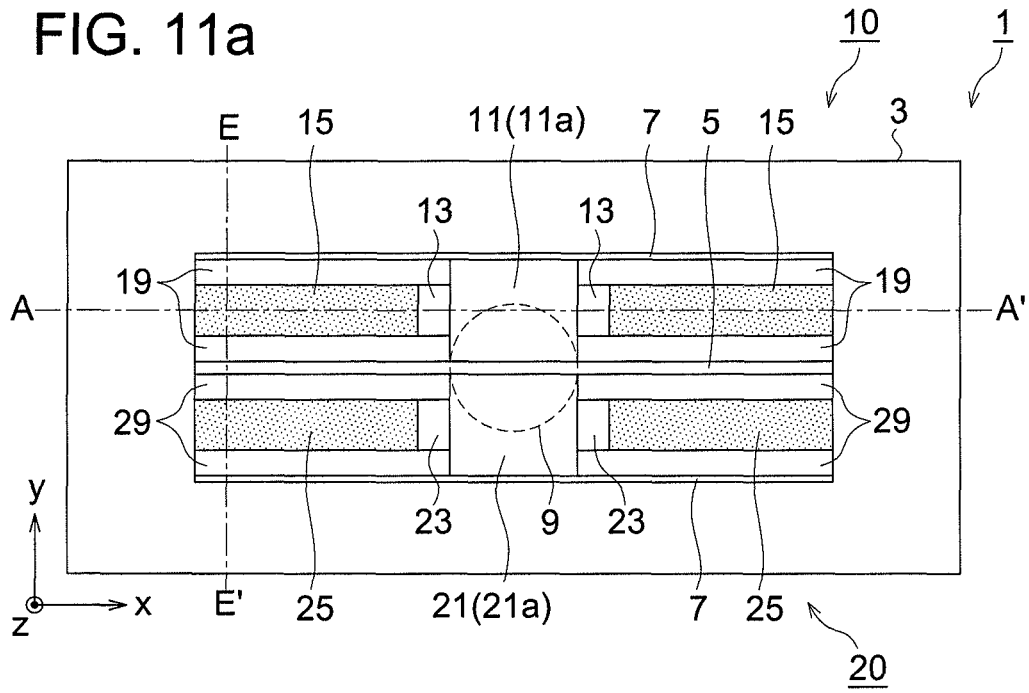
FIGS. 11a-11c are schematic diagrams (1/2) showing the structure of a seventh embodiment of the light reflection mechanism.
Figure 11B:
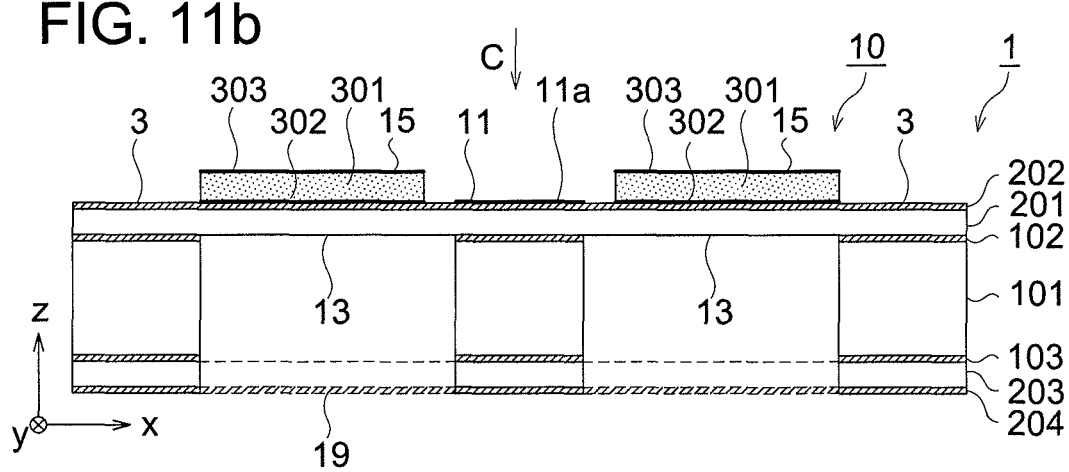
Figure 11C:
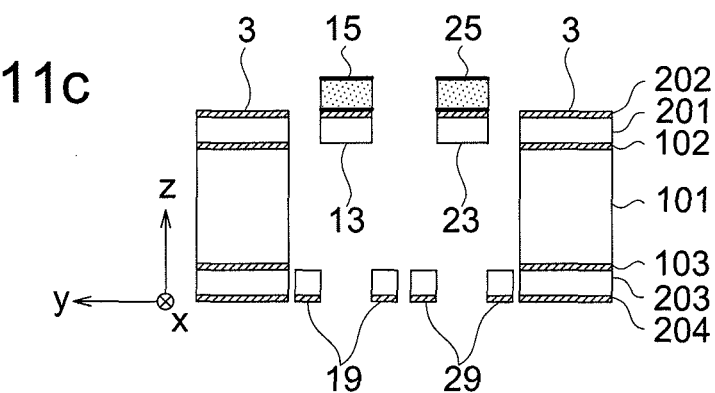
Figure 12A:
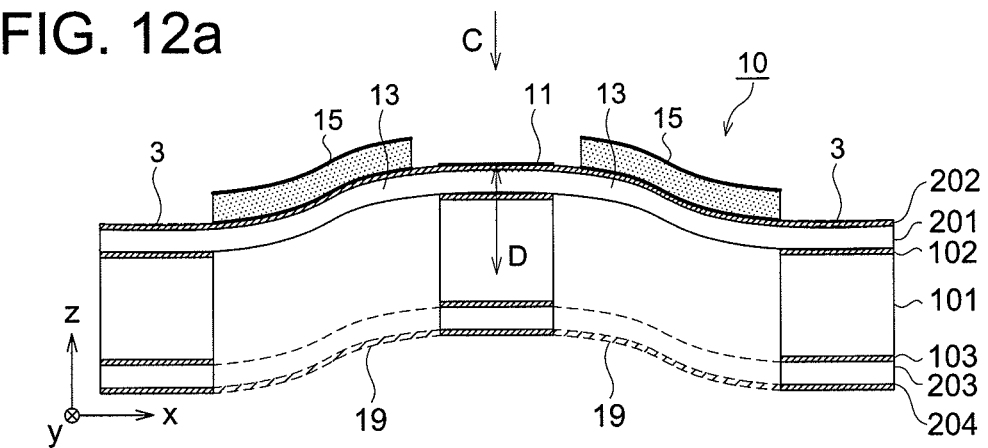
FIGS. 12a and 12b are schematic diagrams (2/2) showing the structure of the seventh embodiment of the light reflection mechanism.
Figure 12B:
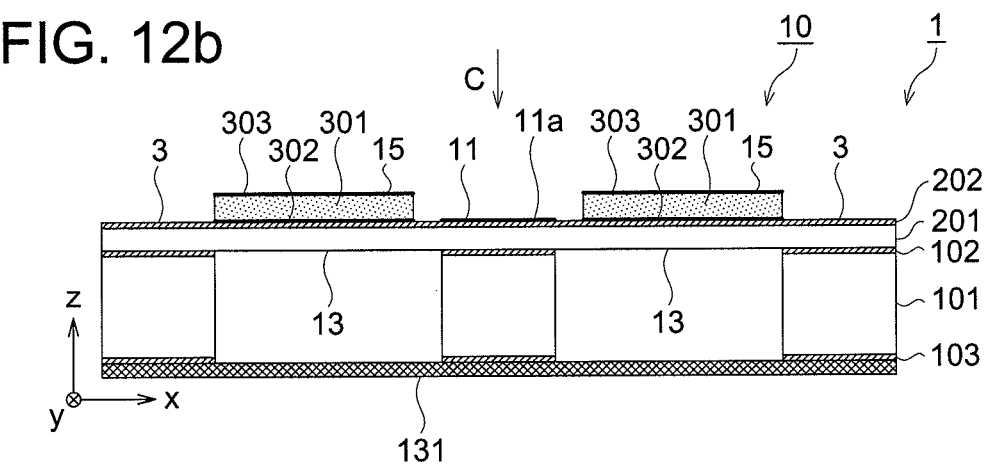

The following describes a seventh embodiment of the light reflection mechanism of the present invention with reference to FIGS. 11a-12b. FIGS. 11a-11c are schematic diagrams showing the structure of the seventh embodiment of the light reflection mechanism. FIG. 11a is a plan view observed from the direction of the arrow C of FIG. 11b. FIG. 11b shows a cross section taken along the line A-A' of FIG. 11a, and FIG. 11c shows a cross section taken along the line E-E' of FIG. 11a. FIG. 12a is a schematic diagram showing the state of driving in FIG. 11b. FIG. 12b shows another example of the seventh embodiment.

In FIG. 11b, in the seventh embodiment, two translating beams 19 extending in the x-axis direction are provided in such a way that the slating beams 19 beams sandwich the first beams 13 of the light reflection mechanism 1 of the first embodiment from both sides in the y-axis direction. Similarly, two translating beams 29 extending in the y-axis direction are provided in such a way that the translation beams 29 sandwich the second beams 23 both sides in the y-axis direction.

In FIGS. 11b and 11c, the translating beams 19 are made up of the active layer 203, which is provided on the other side of the substrate layer 101 of the SOI substrate from the active layer 201, and the supporting portion 3 and the first moving portion 11 are coupled together by the first beams 13 and the translating beams 19 at the both surfaces of the substrate layer 101. Similarly, the supporting portion 3 and second moving portion 21 are coupled together by the second beams 23 and translating beams 29 at the both surfaces of the substrate layer 101.

The thickness of the active layer 203 is the same as that of the active layer 201, and a second oxide film 204 is formed on the surface thereof, similarly to the case of the active layer 201. Regarding the manufacture method of the active layer 203 and second oxide film 204, the active layers 201 and 203 can be bonded on both surfaces of the substrate layer 101 in the Step S02 through S06 of FIG. 3, and be ground. This is followed by the step of forming the second oxide films 202 and 204 on the surface. Further, the translating beams 19 and 29 can be formed by modifying the Steps S11 through 33 as appropriate.

The sum of the widths of the two translating beams 19 is set equal to the width of the first beams 13. The thicknesses are also the same. Thus, the two translating beams 19 and first beams 13 have the same bending rigidity. The two translating beams 19 and the first beams 13 are axially symmetric in the x- and the y-axis directions, and have the same rigidity against the deformation in the z-axis direction. The same thing goes with the two translating beams 29 and the two second beams 23.

When the AC voltage Vac is applied to the piezoelectric elements 15 of FIG. 12a, the translating beams 19 are deformed in conformity to the deformation of the first beams 13 in the same way as the first beams 13, and the first moving portion 11 translates in the z-axis direction. This ensures that the normal line of the first reflection surface 11a on the first moving portion 11 is not tilted with respect to the z-axis direction. The same thing goes with the second moving portion 21.

In the seventh embodiment, a translating mechanism is made up of the beams and the translating beams. This configuration ensures the perpendicularity of the moving direction of the moving portion. Similarly to the case of the first embodiment, if the AC voltages Vac with the resonance frequency and in opposite phases are applied to the piezoelectric elements 15 and 25, the first moving portion 11 and the second moving portion 21 vibrate with a great amplitude D in opposite phases in the z-axis direction even being driven by the small driving force of the piezoelectric element.

In FIG. 12b, in another example of the seventh embodiment, instead of the translating beams 19 formed of the active layer 203 of the SOI substrate, a resin film layer 131 is bonded on the first oxide film 103 on the surface of the substrate layer 101, in addition to the first embodiment. Regarding the other configurations, the structure is the same as that of the seventh embodiment of FIGS. 11a-11c.

In FIG. 12b, when the AC voltage Vac is applied to the piezoelectric elements 15, the resin film layer 131 is also deformed in conformity to the deformation of the first beams 13, and the operation is performed as if the beams were also provided on the back surface of the substrate layer 101. This allows the first moving portion 11 to translation in the z-axis direction similarly to the case of the seventh embodiment. The same thing goes with the second moving portion 21.

The translating mechanism shown in the seventh embodiment and eight embodiment to be described later can be manufactured by various methods described in the Japanese Patent Application No. 2009-50577 (translating mechanism and method for manufacturing translating mechanism), which has already been filed by the present applicants.

As described above, the seventh embodiment of the light reflection mechanism provides a light reflection mechanism, an optical interferometer, and a spectrometric analyzer which are compact, energy-saving, inexpensive yet high-performance since the embodiment includes: first and second moving portions each having a reflection surface thereon which is formed on the same plane; supporting portions which support the first and second moving portions; a first beam which couples the first moving portion and the supporting portion together; a second beam which couples the second moving portion and the supporting portion together; a piezoelectric element provided on the first and second beams; and translating beams provided on the side of the supporting portion opposite to the first and second beams, and since the first and second moving portions are moved in opposite phases in the direction perpendicular to the reflection surface on the surfaces of the first and second moving sections, the displacement of the first and second moving portions can be reduced by half; and the first and second moving portions do not need to be aligned and can be translated in high precision.

Figure 13:
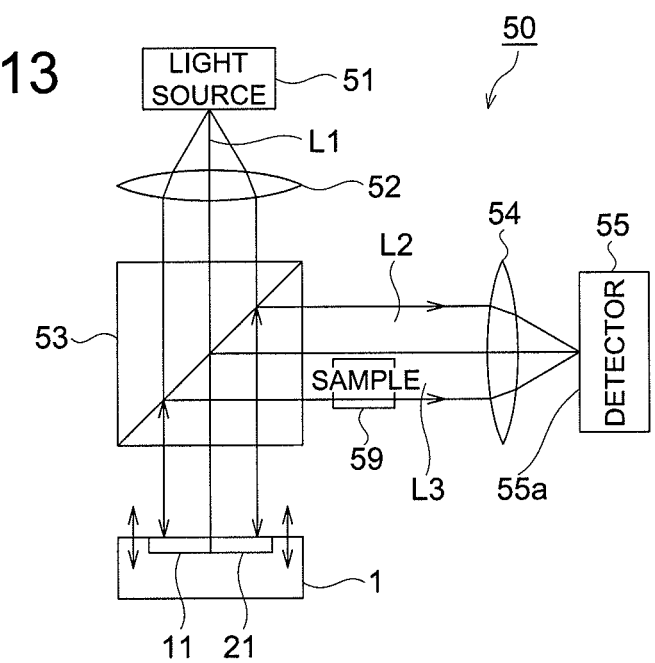
FIG. 13 is a schematic diagram showing the structure of a first embodiment of an optical interferometer.
Figure 14:
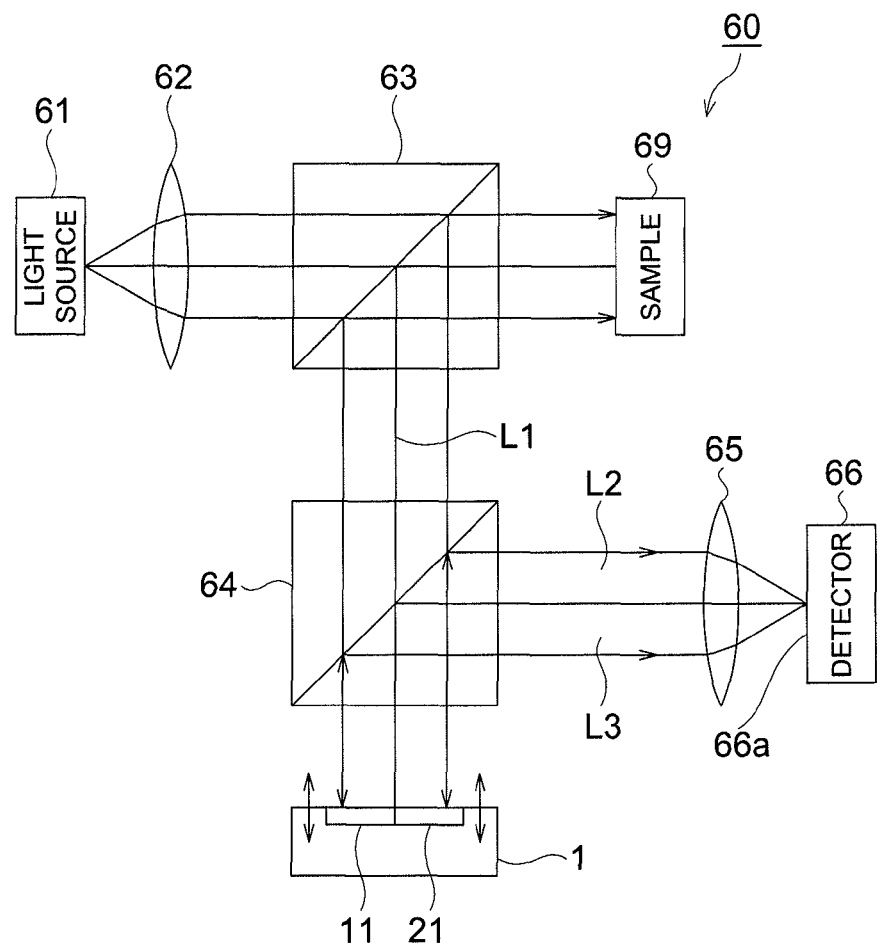
FIG. 14 is a schematic diagram showing the structure of a first embodiment of a spectrometric analyzer.

Referring to FIGS. 13 and 14, the following describes a first embodiment of an optical interferometer and a spectrometric analyzer in the present invention, respectively. FIG. 13 is a schematic diagram showing the structure of the first embodiment of an optical interferometer of the present invention. FIG. 14 is a schematic diagram showing the structure of the first embodiment of a spectrometric analyzer of the present invention.

In FIG. 13, the optical interferometer 50 includes a light source 51, a collimating optical system 52, a beam splitter 53, a light converging optical system 54, a detector 55, and the light reflection mechanism 1 of the present invention. The light L1 from the light source 51 is converted to the collimated light by the collimating optical system 52, and passes through the beam splitter 53 to reach the light reflection mechanism 1. The light L1 is split into the two light beams—light L2 and light L3—which are given an optical path difference by the first moving portion 11 and the second moving portion 21, which are vibrating in the resonance frequency in opposite phases. These light beams are reflected rightward in the drawing by the beam splitter 53.

The light L2 is converged as the reference light L2 directly by the light converging optical system 54 and is inputted into the detector 55. In the meantime, a sample 59 is placed in the optical path of the light L3, and the light L3 passing through the sample 59 is also converged by the light converging optical system 54 and is put into the detector 55. The reference light L2 and the light L3 having passed through the sample 59 are brought into interference with each other on the light converging surface 55a of the detector 55. The interference fringe caused by the optical characteristics of the sample 59 is detected by the detector 55.

In FIG. 14, the spectrometric analyzer 60 includes a light source 61, a collimating optical system 62, a first beam splitter 63, a second beam splitter 64, a light converging optical system 65, a detector 66 and the light reflection mechanism 1 of the present invention. The light from the light source 61 is converted into the collimated light and is inputted into the sample 69 after passing through the first beam splitter 63.

The light L1 reflected by the sample 69 is reflected downward in the drawing by the first beam splitter 63, and is put into the light reflection mechanism 1 through the second beam splitter 64.

The light L1 having entered the light reflection mechanism 1 is split into two light beams—light L2 and light L3—, which are given an optical path difference by the first moving portion 11 and the second moving portion 21, which are vibrating in the resonance frequency in opposite phases. These light beams are reflected rightward in the drawing by the second beam splitter 64.

The reflected light L2 and light L3 are converged by the light converging optical system 65 and are inputted into the detector 66. The two light beams—the light L2 and the light L3—, which are reflected by the sample 69 and given the optical path difference are made to interfere with each other on the light converging surface 66a of the detector 56, and the detector 66 detects the change in the intensity of the interference light so that the wavelength components contained in the reflected light are detected.

As described above, the first embodiment of the interferometer and the spectrometric analyzer provides an optical interferometer, and a spectrometric analyzer which are compact, energy-saving, inexpensive yet high-performance since the embodiment includes a light reflection mechanism including: first and second moving portions each having a reflection surface thereon which is formed on the same plane; supporting portions which support the first and second moving portions; a first beam which couples the first moving portion and the supporting portion together; a second beam which couples the second moving portion and the supporting portion together; and a driving portion which moves the first and second moving portions, wherein the first and second moving portions are moved in opposite phases in the direction perpendicular to the reflection surface on the surfaces of the first and second moving sections, and since the embodiment causes the light passing through the sample and the reference light to interfere with each other of causes the light beams reflected by the sample to interfere with each other, the displacement of the first and second moving portions can be reduced by half, and a step of positioning the first and second moving portions can be eliminated.

Figure 15A:
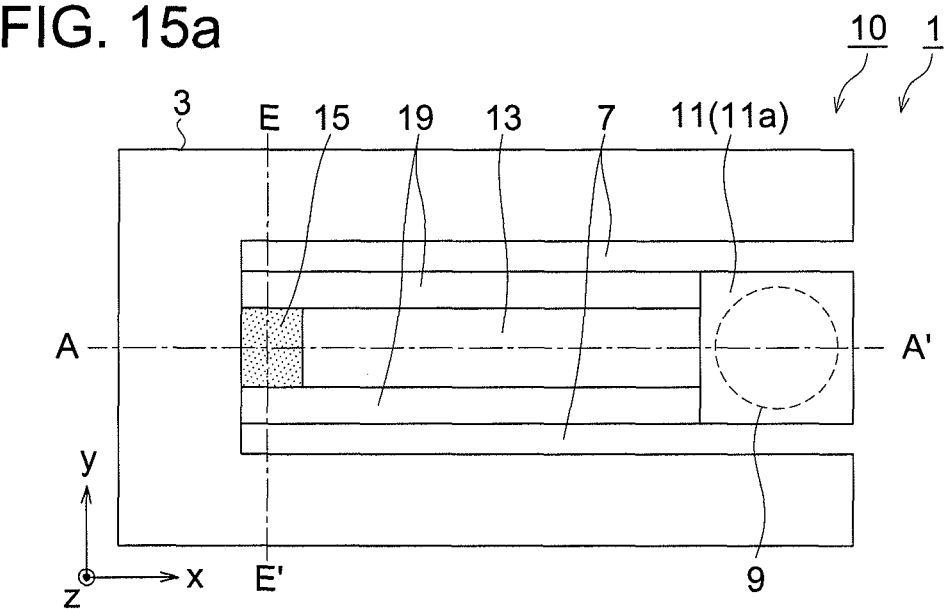
FIGS. 15a-15c are schematic diagrams (1/2) showing the structure of an eighth embodiment of the light reflection mechanism.
Figure 15B:
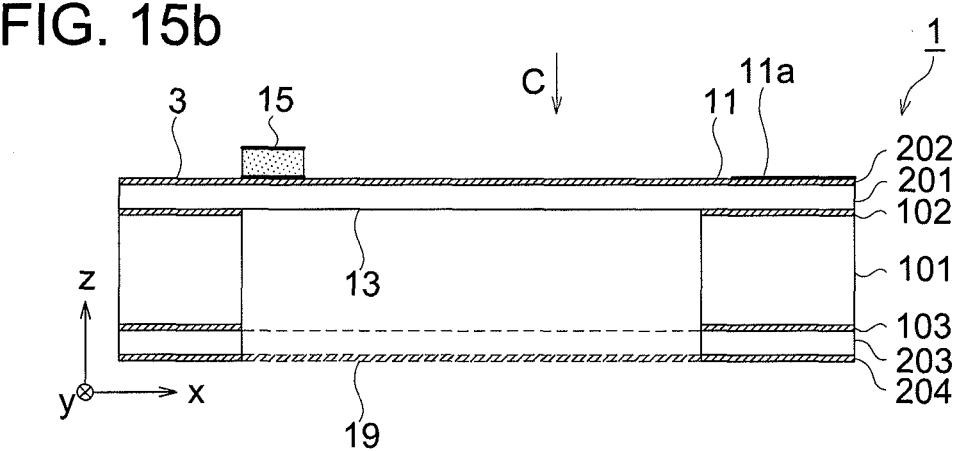
Figure 15C:
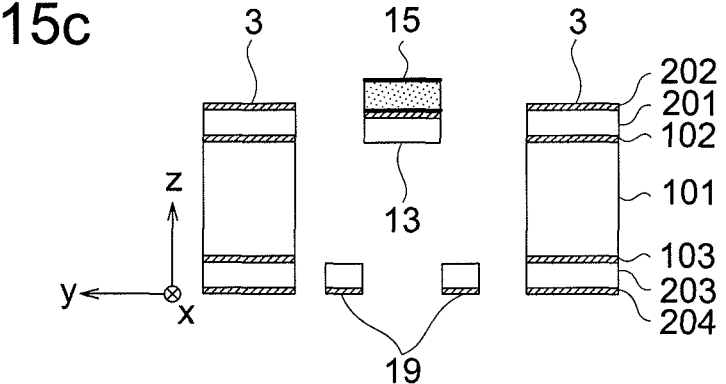

Referring to FIGS. 15a-15c and 16, the following describes an eighth embodiment of the light reflection mechanism in the present invention: FIGS. 15a-15c are schematic diagrams showing the structure of the eighth embodiment of the light reflection mechanism. FIG. 15a is a plan view of the light reflection mechanism viewed from the direction of the arrow C of FIG. 15b. FIG. 15b is a cross section taken along the line A-A' of FIG. 15a. FIG. 15c is a cross section taken along the line E-E' of FIG. 15a. FIG. 16a is a schematic diagram showing FIG. 15b being driven.

In the seventh embodiment, the first moving portion 11 is coupled with the supporting portion 3 by means of the first beams provided on both sides of the first moving portion 11 and the translating beams 19, thereby constructing a translating mechanism for translating the first moving portion 11 in the z-axis direction. By contrast, in the translating mechanism of the eighth embodiment, the supporting portion 3 is coupled by means of a first beam 13 of cantilever beam and a translating beam 19, and resonance vibration is caused, thereby constituting a translating mechanism for translating the first moving portion 11 in the z-axis direction.

In the aforementioned first through seventh embodiments, the first moving portion 11 and the second moving portion 21 vibrate in opposite phases, thereby increasing the optical path difference. In the eighth embodiment, there will be described a method for largely moving only the first moving portion 11.

As shown in FIG. 15a, in the eighth embodiment, the first moving portion 11 is coupled with the supporting portion 3 by means of one first beam 13 extending in the x-axis direction and two translating beams 19. The coupling end of the first beams 13 for the connection with the supporting portion 3 is provided with a piezoelectric elements 15 serving as the drive potion of the present invention. Unlike the case of the seventh embodiment, the piezoelectric elements 15 is provided only on the end portion, not on all the upper surface of the first beam 13, so as not to reduce the resonance vibration of the first beams 13. A first reflection surface 11a is provided on the first moving portion 11.

In FIGS. 15b and 15c, similarly to the case of the seventh embodiment, two translating beams 19 are made up of an active layer 203, which is on the other side of the substrate layer 101 of the SOI substrate from the active layer 201. The supporting portion 3 and first moving portion 11 are connected to both surfaces of the substrate layer 101 by means of the first beams 13 and two translating beams 19.

Similarly to the case of the seventh embodiment, the thickness of the active layer 203 is the same as that of the active layer 201, and a second oxide film 204 is formed on the surface thereof, similarly to the surface of the active layer 201. To manufacture the active layer 203 and the second oxide film 204, the active layers 201 and 203 can be bonded on both surfaces of the substrate layer 101 in the Steps S02 through S06 of FIG. 3, and be ground. The translating beams 19 can be formed by modifying the Steps S11 through S33 of FIG. 3 as appropriate.

Again similarly to the case of the seventh embodiment, the sum of the widths of two translating beams 19 is set equal to the width of the first beam 13. The thicknesses are also the same. Thus, the two translating beams 19 and the first beam 13 have the same bending rigidity. The two translating beams 19 and the first beam 13 are axially symmetric in the x- and y-axis directions, and have the same rigidity against the deformation in the z-axis direction.

Figure 16:
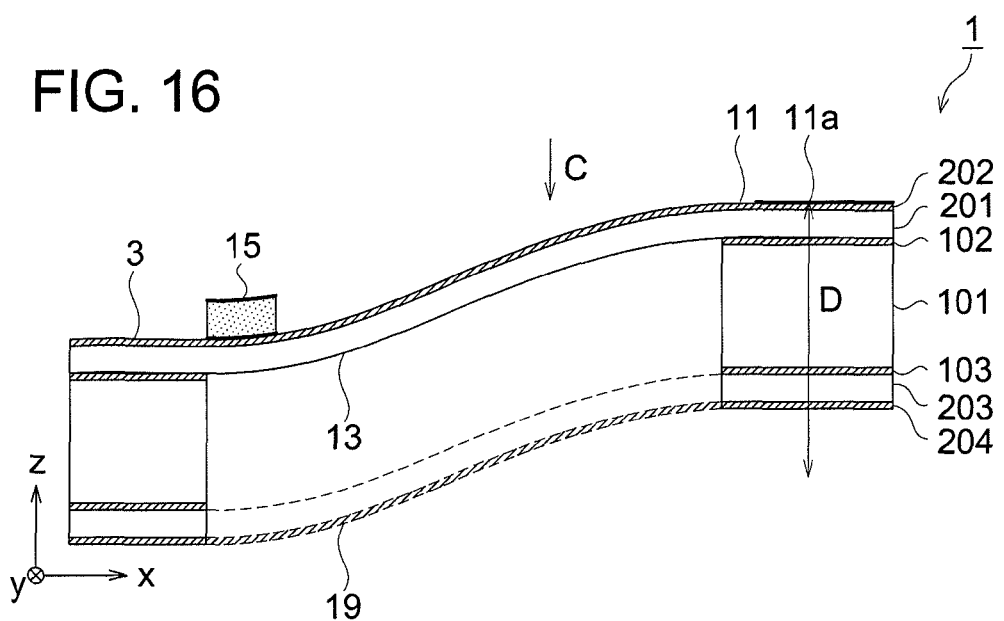
FIG. 16 is a schematic diagram (2/2) showing the structure of the eighth embodiment of the light reflection mechanism.

When the AC voltage Vac is applied to the piezoelectric elements 15 of FIG. 16, the first moving portion 11 supported only at one end by the first beam 13 and the two translating beams 19 vibrates in the z-axis direction. According to a detailed simulation, when the frequency of the AC voltage Vac applied to the piezoelectric elements 15 is set to the frequency at which the first moving portion 11 vibrates in resonance, the first moving portion 11 translates in the z-axis direction in the primary mode of the resonance frequency even when a cantilever beam is used, with the result that the normal line of the first reflection surface 11a is not tilted with respect to the z axis.

Since the cantilever beam is used for resonance vibration, the amplitude D of the vibration of the first moving portion 11 in the z-axis direction is large. Thus, greater amplitude is obtained by smaller energy.

As described above, the eighth embodiment of the light reflection mechanism provides a light reflection mechanism, an optical interferometer, and a spectrometric analyzer which are compact, energy-saving, inexpensive, yet high-performance since the mechanism includes: a first moving portion having a reflection surface on the surface thereof; a supporting portion which supports the first moving portion; a first beam and a translating beam which couple the first moving portion and the supporting portion together in a cantilever beam structure each at the upper part and the lower part of the supporting portion; and a driving portion which moves the first moving portion, and since a large amplitude can be obtained by small energy since the first moving portion is vibrated in resonance in the direction perpendicular to the first reflection surface.

Figure 17:
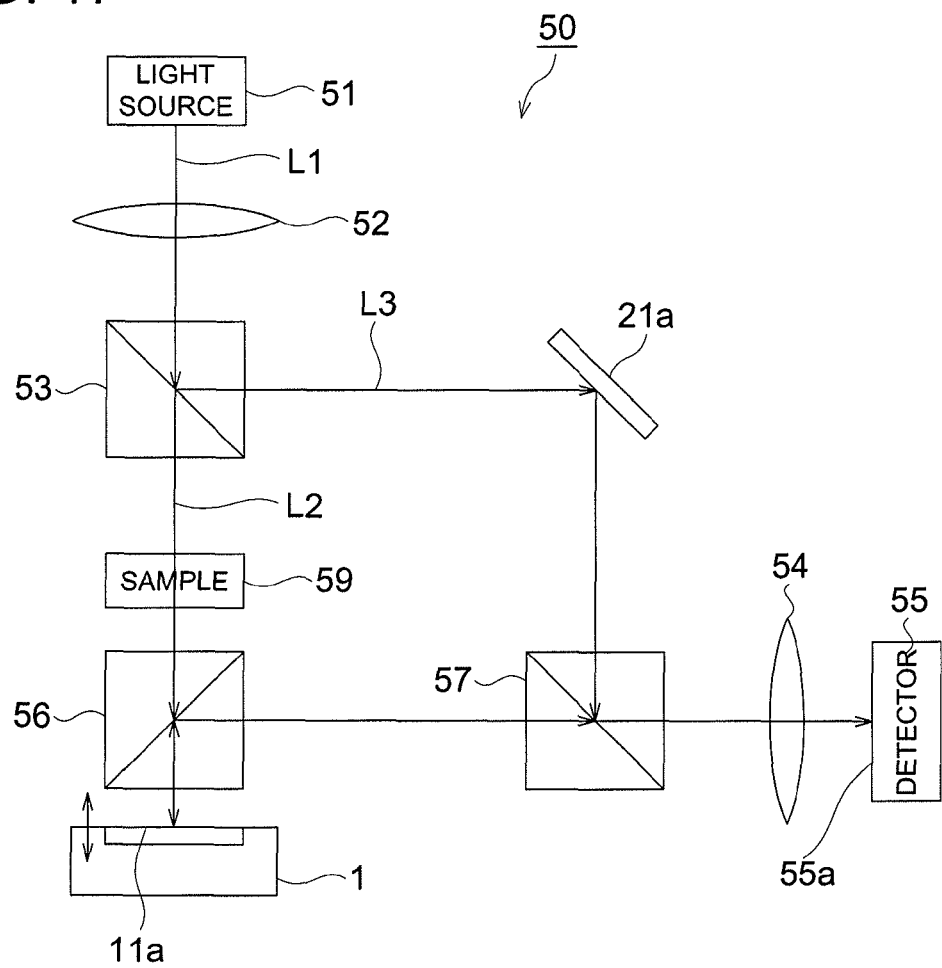
FIG. 17 is a schematic diagram showing the structure of a second embodiment of the optical interferometer.
Figure 18:
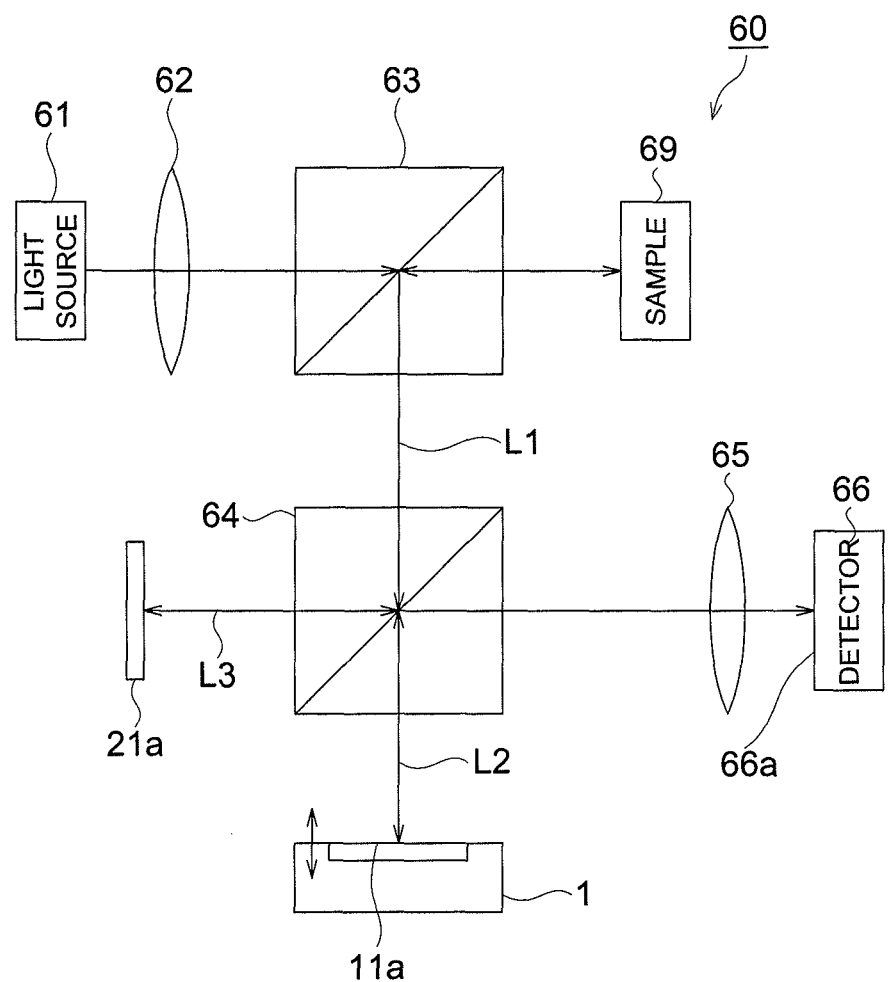
FIG. 18 is a schematic diagram showing the structure of a second embodiment of the spectrometric analyzer.

Referring to FIGS. 17 and 18, the following describes a second embodiment of the optical interferometer and spectrometric analyzer. FIG. 17 is a schematic diagram showing the structure of the second embodiment of an optical interferometer of the present invention. FIG. 18 is a schematic diagram showing the structure of the second embodiment of a spectrometric analyzer of the present invention. The second embodiment of the optical interferometer and spectrometric analyzer uses the eighth embodiment of the aforementioned light reflection mechanism 1 and a fixed second reflection surface 21a.

In FIG. 17, the optical interferometer 50 includes a light source 51, a collimating optical system 52, a beam splitter 53, a second reflection surface 21a; optical deflectors 56 and 57, a light converging optical system 54, a detector 55 and the light reflection mechanism 1 of the eighth embodiment The light L1 from the light source 51 is converted into the collimated light by the collimating optical system 52, and is split by the beam splitter 53 into the detection light L that enters a sample 59 and the reference light L3 that enters the second reflection surface 21a. The reference light L3 is reflected by the second reflection surface 21a and the optical deflector 57, is converged by the light converging optical system 54, and then enters the detector 55.

After having passed through the sample 59, the detection light L2 passes through the optical deflector 56. This light is reflected and given an optical path difference by the first reflection surface 11a of the light reflection mechanism 1. After having passed through the optical deflector 57, the detection light L2 is converged by the light converging optical system 54 and is inputted into the detector 55. From the optical deflector 57 onward, the detection light L2 interferes with the reference light L3, and the interference fringe resulting from the optical characteristics of the sample 59 is detected by the detector 55.

In FIG. 18, the spectrometric analyzer 60 includes a light source 61, a collimating optical system 62, a first beam splitter 63, a second beam splitter 64, a second reflection surface 21a, a light converging optical system 65, a detector 66 and the light reflection mechanism 1 of the eighth embodiment. The light from the light source 61 is converted into the collimated light by the collimating optical system 52, passes through the first beam splitter 63, and enters the sample 69.

The light L1 reflected by the sample 69 is reflected downward in the drawing by the first beam splitter 63, and is split by the second beam splitter 64 into the detection light L2 entering the light reflection mechanism 1 and the reference light L3 entering the second reflection surface 21a. The reference light L3 is reflected by the second reflection surface 21a, passes through the second beam splitter 64, is converged by the light converging optical system 65, and is inputted into the detector 66.

The detection light L2, in the meantime, is reflected after giving the optical path difference by the first reflection surface 11a of the light reflection mechanism 1, and is reflected rightward in the drawing by the second beam splitter 64. This light is then converged by the light converging optical system 65 and is inputted into the detector 66. From the second beam splitter 64 onward, the detection light L2 interferes with the reference light L3. The interference light are measured of intensity chance by the detector 66, whereby the wavelength components contained in the reflected light L1 reflected by the sample 69 is detected.

As described above, the second embodiment of the interferometer and the spectrometric analyzer provides an optical interferometer, and a spectrometric analyzer which are compact, energy-saving, inexpensive, yet high-performance since the embodiment includes a fixed second reflection surface and a light reflection mechanism which includes: a first moving portion having a reflection surface on the surface thereof; a supporting portion which supports the first moving portion; a first beam and a translating beam which couple the first moving portion and the supporting portion together in a cantilever beam structure each at the upper part and the lower part of the supporting portion; and a driving portion which moves the first moving portion in resonance in the direction perpendicular to the first reflection surface, and since the embodiment causes the detection light passing through the sample and the reference light to interfere with each other or causes the detection light reflected by the sample and the reference light to interfere with each other.

As described above, the present invention provides a light reflection mechanism, an optical interferometer, and a spectrometric analyzer which are compact, energy-saving, inexpensive, yet high-performance since the mechanism includes: a first moving portion having a first reflection surface on the surface thereof; a supporting portion which supports the first moving portion; a first beam and a translating beam which couple the first moving portion and the supporting portion together in a cantilever beam structure each at the upper part and the lower part of the supporting portion; and a driving portion which moves the first moving portion, and since a large amplitude can be obtained by small energy since the first moving portion is vibrated in resonance in the direction perpendicular to the first reflection surface.

The present invention further provides a light reflection mechanism, an optical interferometer, and a spectrometric analyzer which are compact, energy-saving, inexpensive yet high-performance since the embodiment includes: first and second moving portions each having a reflection surface thereon which is formed on the same plane; supporting portions which support the first and second moving portions; a first beam which couples the first moving portion and the supporting portion together; a second beam which couples the second moving portion and the supporting portion together; and a driving portion which moves the first and second moving portions, and since the first and second moving portions are moved in opposite phases in the direction perpendicular to the reflection surface on the surfaces of the first and second moving sections, the displacement of the first and second moving portions can be reduced by half; and a step of positioning the first and second moving portions can be eliminated.

The details of the structure and the operation of each element constituting the light reflection mechanism, the optical interferometer and the spectrometric analyzer of the present invention can appropriately modified without departing from the technological spirit of the present invention.

DESCRIPTION OF REFERENCE NUMERALS

1 Light reflection mechanism
2 Magnet
3 Supporting portion
3a Portion, of supporting portion 3, along the gap portion 7
4a Reed-screen-like electrode
4b Reed-screen-like electrode
5 Gap portion
6a Electrode
6b Electrode
6c Fixed electrode
7 Gap portion
8 Vibration transfer portion
9 Light beam 9
10 First reflection system
11 First moving portion
11a First reflection surface
13 First beams
13a Gap portion
14 First drive piece
15 Piezoelectric element
16 Shape memory alloy wire
17 Heater
18 Bimetal
19 Translating beam
20 Second reflection system
21 Second moving portion
21a Second reflection surface
23 Second beam
23a Gap portion
24 Second drive piece
25 Piezoelectric element
26 Shape memory alloy wire
27 Heater
28 Bimetal
50 Optical interferometer
51 Light source
52 Collimating optical system
53 Beam splitter
54 Light converging optical system
55 Detector
56, 57 Optical deflector
59 Sample
60 Spectrometric analyzer
61 Light source
62 Collimating optical system
63 First beam splitter
64 Second beam splitter
65 Light converging optical system
66 Detector
69 Sample
101 Substrate layer (of SOI substrate)
102 First oxide film
103 First oxide film
131 Resin film layer
201, 203 Active layer (of SOI substrate)
202, 204 Second oxide film 300 Piezoelectric element
301 Piezoelectric layer
302 Lower electrode
303 Upper electrode
401 First mask pattern
402 Second mask pattern
403 Third mask pattern
404 Fourth mask pattern
501 Drive circuit

The invention claimed is:

1. An interferometer which causes a detection light having passed through a sample placed in an optical path of the detection light and a reference light to interfere, the interferometer comprising:
   a light source;
   a collimating optical system configured to collimate light entering from the light source;
   a beam splitter configured to split the collimated light entering from the collimating optical system into the reference light and the detection light which enters and passes through the sample;
   a light reflection surface which is located in the optical path of the detection light, the light reflection surface being configured to reflect the detection light so as to give an optical path difference to the detection light; and
   a converging optical system configured to converge the reference light and the detection light which has passed through the sample so that the reference light and the detection light interfere,
   wherein the light reflection surface is configured to be arranged on a light reflection mechanism, the light reflection mechanism comprising:
   a first moving portion which has a top surface, a bottom surface, and a first reflection surface on the top surface;
   a first beam having a fixed end and a free end, the free end being coupled to the first moving portion;
   a translating beam which is provided parallel to, and with a gap from, the first beam, the gap in the direction of the optical path of the detection light, and one end of the translating beam being connected to the bottom surface of the first moving portion;
   a supporting portion having a top surface and a bottom surface, the top surface being directly coupled to the fixed end of the first beam and the bottom surface being directly coupled to the other end of the translating beam in a cantilever beam structure each at the upper part and the lower part of the moving portion and the supporting portion; and
   a driving portion configured to translate the first moving portion so as deform the first beam and the translating beam and to cause the moving portion to vibrate in resonance, so that the normal line of the first reflection surface is not tilted by the cantilever beam structure and the detection light being reflected by the light reflection surface returns along a same optical path towards the beam splitter.

2. A spectrometric analyzer which causes a detection light having been reflected by a sample placed in an optical path of the detection light and a reference light to interfere, the spectrometric analyzer comprising:
   a light source;
   a collimating optical system configured to collimate light emitted from the light source so as to generate collimated light which enters and is reflected by the sample;
   a beam splitter configured to split the collimated light reflected by the sample, or collimated light that passes through the sample, into the detection light and the reference light; and
   a light reflection surface provided in an optical path of the detection light, the light reflection surface being configured to reflect the detection light so as to give an optical path difference to the detection light; and
   a converging optical system configured to converge the detection light having the optical path difference and the reference light so that the detection light having the optical path difference and the reference light interfere,
   wherein the light reflection surface is configured to be arranged on a light reflection mechanism, the light reflection mechanism comprising:
   a first moving portion which has a top surface, a bottom surface, and a first reflection surface on the top surface;
   a first beam having a fixed end and a free end, the free end being coupled to the first moving portion;
   a supporting portion having a top surface and a bottom surface and being directly coupled to the fixed end of the first beam and which supports the first moving portion through the first beam;
   a translating beam which is provided parallel to, and with a gap from, the first beam, the gap in the direction of the optical path of the detection light, and one end of the translating beam being connected to the bottom surface of the first moving portion, and the translating beam extends along the first beam, and the other end of the translating beam is connected to the bottom surface of the supporting portion,
   wherein the first moving portion and the supporting portion are arranged between the first beam and the translating beam to form a cantilever beam structure between the upper part and the lower part of the moving portion and the supporting portion; and
   a driving portion configured to translate the first moving portion so as deform the first beam and the translating beam and to cause the moving portion to vibrate in resonance in a same direction perpendicular to the first reflection surface, so that a line normal to the first reflection surface is not tilted by the cantilever beam structure during the vibration of the first moving portion and the reflected detection light being reflected by the light reflection surface returns along a same optical path towards the beam splitter.

3. A spectrometric analyzer which has a light reflection mechanism configured to reflect light from a sample, the spectrometric analyzer comprising:
   a beam splitter configured to split the light reflected by the sample into a detection light and a reference light;
   a first reflection surface configured to move in a direction perpendicular to the first reflection surface by a light reflection mechanism and to reflect the detection light;
   a second reflection surface which is fixed and reflects the reference light;
   a converging optical system configured to converge the reflected detection light having the optical path different to the reflected reference light so that the reference light and the detection light interfere; and
   a detector configured to detect the interfering light,
   the light reflection mechanism comprising:
   a first moving portion which has a top surface, a bottom surface, and the first reflection surface on the top surface;

a first beam having a fixed end and a free end, the free end being coupled to the first moving portion;

a supporting portion having a top surface and a bottom surface and being directly coupled to the fixed end of the first beam and which supports the first moving portion through the first beam;

a translating beam which is provided parallel to, and with a gap from, the first beam, the gap in the direction of an optical path of the detection light, and one end of the translating beam being connected to the bottom surface of the first moving portion, and the translating beam extends along the first beam, and the other end of the translating beam is connected to the bottom surface of the supporting portion, wherein the first moving portion and the supporting portion are arranged between the first beam and the translating beam to form a cantilever beam structure extending between the upper part and the lower part of the moving portion and the supporting portion; and a driving portion configured to translate the first moving portion so as deform the first beam and the translating beam and to cause the first moving portion to vibrate in resonance in a same direction perpendicular to the first reflection surface, so that a line normal to the first reflection surface is not tilted by the cantilever beam structure during the vibration of the first moving portion and the reflected detection light being reflected by the first reflection surface returns along a same optical path toward the beam splitter.

4. A spectrometric analyzer which has a light reflection mechanism configured to reflect light from a sample, the spectrometric analyzer comprising:

a beam splitter configured to split the light reflected by the sample into a first light and a second light;

a first reflection surface configured to move in a direction perpendicular to the first reflection surface by a light reflection mechanism and to reflect the first light;

a second reflection surface which is fixed and configured to reflect the second light;

a converging optical system configured to converge the reflected first light having the optical path different to the reflected second light so that the reflected first light and the reflected second light interfere;

a detector configured to detect the interfering light, wherein the light reflection mechanism comprises:

a first moving portion which has a top surface, a bottom surface, and the first reflection surface on the top surface;

a first beam having a fixed end and a free end, the free end being coupled to the first moving portion;

a translating beam which is provided parallel to, and with a gap from, the first beam, the gap in the direction of an optical path of the first light, and one end of the translating beam being connected to the bottom surface of the first moving portion;

a supporting portion having a top surface and a bottom surface, the top surface being directly coupled to the fixed end of the first beam and the bottom surface being directly coupled to the other end of the translating beam so as to form a cantilever beam structure extending between the upper part and the lower part of the first moving portion and the supporting portion; and a driving portion configured to translate the first moving portion so as deform the first beam and the translating beam and to cause the first moving portion to vibrate in resonance, so that a line normal to the first reflection surface is not tilted by the cantilever beam structure during the vibration of the first moving portion and the reflected detection light being reflected by the first reflection surface returns along a same optical path toward the beam splitter.

* * * * *